US009008876B2

(12) United States Patent
Pinto et al.

(10) Patent No.: US 9,008,876 B2
(45) Date of Patent: Apr. 14, 2015

(54) YAW MOTION CONTROL OF A VEHICLE

(75) Inventors: Lorenzo Pinto, Nuneaton (GB); Simon Aldworth, Nuneaton (GB); Maria Del Mar Franco-Jorge, Nuneaton (GB); Martin James Watkinson, Nuneaton (GB)

(73) Assignee: Mira Limited, Nuneaton (GB)

( * ) Notice: Subject to any disclaimer, the term of this patent is extended or adjusted under 35 U.S.C. 154(b) by 240 days.

(21) Appl. No.: 13/701,585

(22) PCT Filed: May 31, 2011

(86) PCT No.: PCT/GB2011/000824
§ 371 (c)(1),
(2), (4) Date: Feb. 21, 2013

(87) PCT Pub. No.: WO2011/151615
PCT Pub. Date: Dec. 8, 2011

(65) Prior Publication Data
US 2013/0144476 A1    Jun. 6, 2013

(30) Foreign Application Priority Data
Jun. 3, 2010 (GB) .................................. 1009320.1

(51) Int. Cl.
*B60L 11/00* (2006.01)
*B60T 8/1755* (2006.01)

(52) U.S. Cl.
CPC ............. *B60L 11/00* (2013.01); *B60T 8/17555* (2013.01); *B60T 2230/02* (2013.01); *B60T 2270/303* (2013.01); *B60T 2270/613* (2013.01); *Y10S 903/93* (2013.01)

(58) Field of Classification Search
USPC ........................................... 701/70; 180/312
See application file for complete search history.

(56) References Cited

U.S. PATENT DOCUMENTS

| 6,691,013 B1 | 2/2004 | Brown |
| 2004/0176899 A1 | 9/2004 | Hallowell |

(Continued)

FOREIGN PATENT DOCUMENTS

| DE | 102006051908 | 10/2007 |
| DE | 102007000264 | 11/2007 |

(Continued)

OTHER PUBLICATIONS

International Search Report and Written Opinion dated Sep. 22, 2011 for Application No. PCT/GB2011/000824, 10 pages.

*Primary Examiner* — James Trammell
*Assistant Examiner* — Sanjeev Malhotra
(74) *Attorney, Agent, or Firm* — Hollingsworth Davis, LLC

(57) ABSTRACT

A vehicle having two forwardly positioned steerable road wheels and first and second rearwardly positioned wheels disposed on opposing lateral sides of the vehicle has first and second independently controllable electric motors to apply driving and braking torque to respective rearwardly positioned wheels. An angle sensor indicates a steering angle of the steerable road-wheels, and a speed sensor indicates vehicle longitudinal speed. A yaw-rate sensor indicates the vehicle's measured yaw-rate. The vehicle has control means to determine a target yaw-rate from the steering angle of the steerable road wheels and the longitudinal velocity; determine a yaw rate error by comparing the vehicle's measured yaw-rate with said target yaw-rate, and determine an amount of yaw torque to correct or reduce the yaw-rate error; and control the electric motors to apply an amount of differential torque to the respective first and second rearwardly positioned wheels to generate said amount of yaw torque.

17 Claims, 13 Drawing Sheets

(56) References Cited

U.S. PATENT DOCUMENTS

| | | | |
|---|---|---|---|
| 2004/0199321 A1* | 10/2004 | Lin et al. | 701/70 |
| 2007/0021875 A1 | 1/2007 | Naik et al. | |
| 2007/0185638 A1* | 8/2007 | Odenthal et al. | 701/70 |
| 2007/0267241 A1* | 11/2007 | Ball | 180/312 |
| 2009/0082925 A1 | 3/2009 | Wijffels et al. | |

FOREIGN PATENT DOCUMENTS

| | | |
|---|---|---|
| DE | 102007022849 | 11/2008 |
| FR | 2840577 | 12/2003 |
| GB | 2456115 | 4/2011 |
| JP | 2005184911 | 7/2005 |
| JP | 2008024204 | 2/2008 |
| JP | 2008178255 | 7/2008 |
| JP | 2008295244 | 12/2008 |
| JP | 2009062030 | 3/2009 |
| JP | 2009132389 | 6/2009 |
| KR | 10-2005-0022380 | 3/2005 |
| WO | WO2009077835 | 6/2009 |

* cited by examiner

Handwheel input from limit cornering

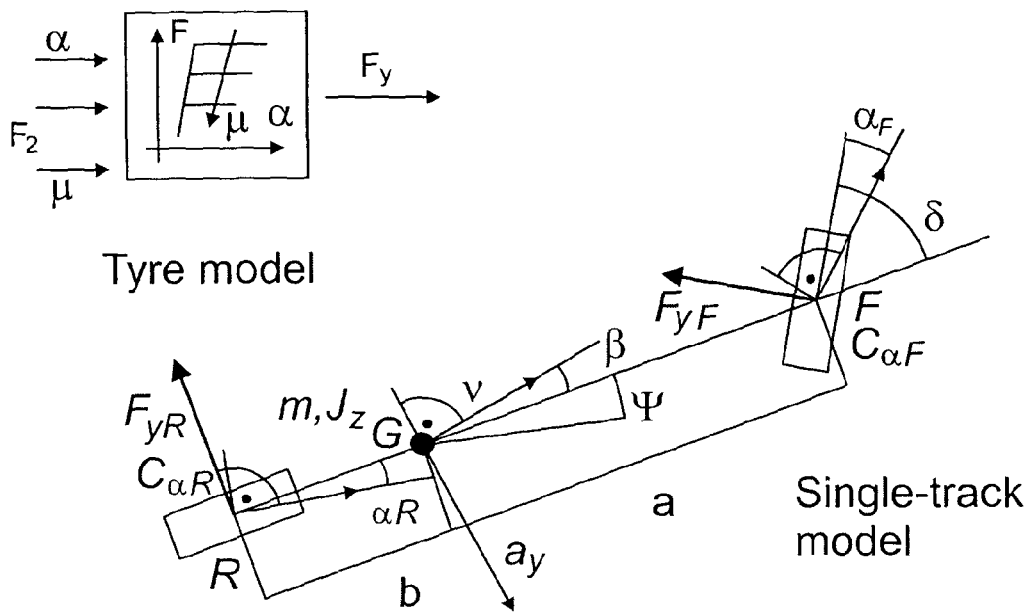

Equations $F_{yF} = C_{\alpha F} \cdot \alpha_F$ ; $F_{yR} = C_{\alpha R} \cdot \alpha_R$ ;

$m a_y = F_{yF} + F_{yR}$ $a_y = V_x (\dot{\Psi} + \dot{\beta})$ $\dot{\beta} = -\dot{\Psi} + \dfrac{1}{mV_x}\left(F_{yF} + F_{yR}\right)$ $\ddot{\Psi} = \dfrac{1}{J_z}\left(F_{yF} \cdot a + F_{yR} \cdot b\right)$ $\dot{\Psi} = \int \ddot{\Psi}\, dt$ ; $\beta = \int \dot{\beta}\, dt$ $\alpha_F = \delta_F - \beta - \dfrac{a * \dot{\Psi}}{V_x}$ ; $\alpha_R = -\beta + \dfrac{b * \dot{\Psi}}{V_x}$

Input to the model
$\delta_F$, $V_x$, ($F_z$, $\mu$)

Output
$\dot{\Psi}$, $\beta$, $\dot{\beta}$, $\alpha$, $F_y$, $a_y$

Parameters
$m$, $J_z$, $C_\alpha$, $a$, $b$

Fig. 9 a) intervention during acceleration

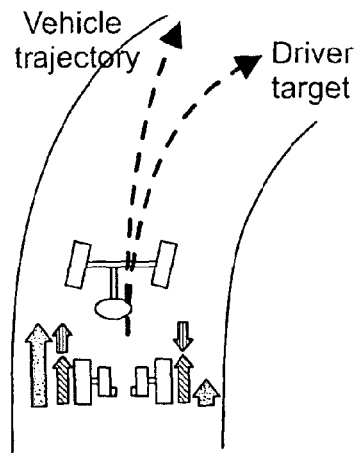

▨ Traction torque
▥ Yaw-control torque
▦ Total torque b) intervention during regenerative-braking

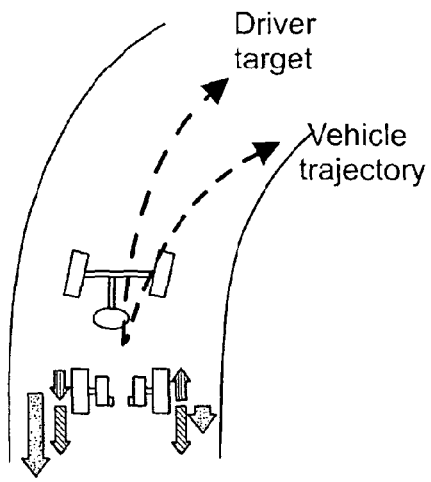

▨ Regenerative-braking torque
▥ Yaw-control torque
▦ Total torque c) motor failure during acceleration

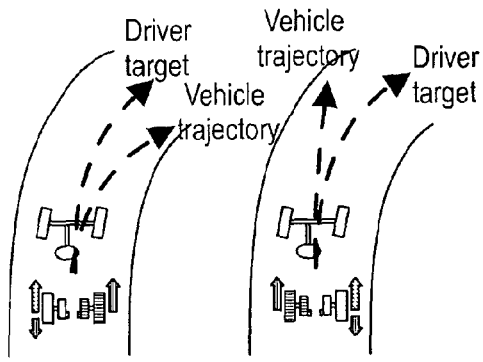

▨ Traction torque
▥ Yaw-control torque d) motor failure during regenerative-braking

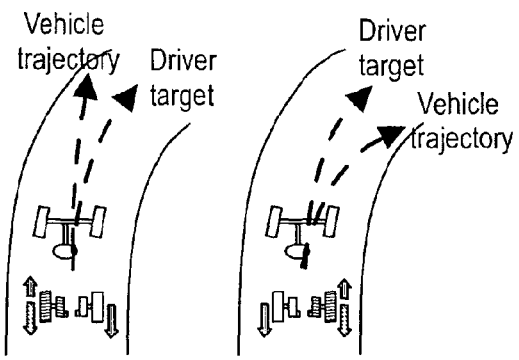

▨ Regenerative-braking torque
▥ Yaw-control torque

Fig. 14

YAW MOTION CONTROL OF A VEHICLE

The present invention relates to yaw control in vehicles, and in particular to the application of yaw control in vehicles having electric motors to drive at least some of the wheels of the vehicle.

There are a number of existing systems in the automotive sector used in compensating for understeer and oversteer in vehicles. A commonly used definition for understeer and oversteer is the tendency of the vehicle to yaw less or more than what was intended by the driver. Typical examples of such systems include: electronic stability control systems that use individual wheel brakes to generate a corrective yaw moment; active steering systems that add or subtract a steering angle to generate a corrective yaw moment; and electronically controlled limited slip differentials which transfer torque from one side of the vehicle to the other. All existing systems have advantages and disadvantages in their relative complexity and their individual limitations in the ability to perform understeer and oversteer correction.

An increasing number of road vehicles now use hybrid power solutions requiring the provision of electric motors for direct drive of at least some of the road wheels of the vehicle. The provision of independently controllable electric motors driving some or all of the road wheels of a vehicle facilitates a number of alternative strategies for providing understeer or oversteer compensation compared with those systems that use separate control of the brakes, steering or differentials.

It is an object of the present invention to provide an improved yaw control system for a vehicle using direct electric motor drive of at least some of the wheels of a vehicle.

According to one aspect, the present invention provides a vehicle comprising:
  at least two forwardly positioned steerable road wheels;
  at least first and second rearwardly positioned wheels disposed on opposing lateral sides of the vehicle, each coupled to a respective first and second electric motor adapted to apply driving and braking torque to the respective wheel, the first and second electric motors being independently controllable;
  at least one angle sensor configured to provide an output indicative of a steering angle of the steerable roadwheels;
  at least one speed sensor configured to provide an output indicative of the vehicle longitudinal speed;
  a vehicle yaw-rate sensor configured to provide an output indicating the vehicle's measured yaw-rate;
  control means adapted to:
  determine a target yaw-rate from at least the road-wheel angle and the vehicle longitudinal velocity;
  determine a yaw rate error by comparing at least the vehicle's measured yaw-rate with said target yaw-rate, and determine an amount of yaw torque needed to correct or reduce the yaw-rate error;
  control said first and second electric motors to apply an amount of differential torque to the respective first and second rearwardly positioned wheels so as to generate said amount of yaw torque.

The forwardly positioned wheels of the vehicle may be connected to an internal combustion engine for normal forward propulsion of the vehicle. The vehicle may be configured to provide the electrical energy required to provide the driving torque to one of the motors by energy recovered from the other one of the motors providing a braking torque. The control means may be adapted to determine a target yaw rate which is larger in magnitude than a maximum yaw rate allowed by a road coefficient of adhesion and to apply an amount of differential torque using the first and second electric motors so as to increase the yawing of the vehicle by increasing or building vehicle side-slip angle above the steady-state value allowed by the coefficient of adhesion. The control means may be adapted to determine a target yaw rate which has a phase lag with respect to a steering hand-wheel input, and to apply an amount of differential torque using the first and second electric motors so as to reduce the phase lag of vehicle yaw-rate with respect to driver hand-wheel input. The control means may be adapted to determine a target yaw rate which has a level of damping and control first and second electric motors to apply an amount of differential torque to the respective first and second rearward positioned wheels so as to generate a desired amount of yaw torque to reduce transient yaw overshoots. The vehicle may include two sensors configured to provide an output indicating the rotational speeds of the rear wheels independent of said speed sensor indicating said longitudinal velocity of the vehicle, and the control means may be further adapted to determine the longitudinal slip of the rear wheels from at least said rotational speed of the rear wheels and vehicle longitudinal velocity, determine target values for rear wheels longitudinal slip, and control the first and second electric motors to apply said amount of differential torque without exceeding the target values of desired rear wheels longitudinal slip. The control means may be further adapted to determine the side-slip velocity $d\beta$; determine a side-slip velocity threshold; and control the first and second electric motors to apply said amount of differential torque without exceeding the side-slip velocity threshold. The control means may be further adapted to determine the side-slip angle $\beta$; determine side-slip angle threshold; and control the first and second electric motors to apply said amount of differential torque without exceeding the side-slip angle threshold. The control means may be further adapted to determine the side-slip velocity $d\beta$; determine a side-slip velocity threshold; determine an amount of target yaw torque based on the magnitude of an error in side-slip velocity with respect to the threshold; and control the first and second electric motors to apply said amount of differential torque so as to generate the amount of target yaw torque to oppose side-slip velocity error. The control means may be further adapted to determine the side-slip angle $\beta$; determine a side-slip angle threshold; determine an amount of target yaw torque based on the magnitude of the error of side-slip angle respect to the threshold; and control the first and second electric motors to apply said amount of differential torque so as to generate the amount of target yaw torque to oppose side-slip angle error. The control means may be adapted to apply equal magnitude differential torque using the first and second electric motors to correct or reduce the yaw rate error. The vehicle may also include two sensors configured to provide an output indicative of the rotational speeds of the rear wheels, and the control means may be further adapted to control the first and second electric motors to apply said amount of differential torque without exceeding a threshold value for rotational acceleration and/or deceleration of the rear wheels. The vehicle may further include at least one driver acceleration pedal sensor configured to provide an output indicative of the driver acceleration pedal demand and the control means may be further adapted to: determine a desired amount of traction or braking torque for the first and second electric motors based on the driver acceleration pedal demand; and control the first and second electric motors to apply said desired amount of traction or braking torque superimposed on said differential torque without exceeding a threshold value of yaw rate error due to the traction or braking torque supplied by the first and second electric motors. The vehicle may further include at least one driver brake pedal sensor configured to provide an output indicative of the driver brake pedal demand, and the control means may be further adapted to; determine a desired amount of braking torque for the first and second electric motors based on the driver brake pedal demand; control the first and second electric motors to apply said desired amount of braking torque superimposed on said differential torque without exceeding a threshold value of yaw rate error due to the braking torque supplied by the first and second electric motors. The control means may be adapted to apply an amount of differential torque using the first and second electric motors so as to regenerate electric energy in the battery. The vehicle may include at least one driver acceleration pedal sensor configured to provide an output indicative of the driver acceleration pedal demand, and the control means may be further adapted to: determine a desired amount of traction torque for the first and second electric motors based on the driver acceleration pedal demand; control the first and second electric motors to apply the desired amount of traction torque superimposed on the differential torque; and in the event of a failure of one of the first and second electric motors, control the other electric motor to apply an amount of braking torque thereby applying a differential torque to the first and second rearwardly positioned wheels and reducing a yaw rate error due to the failure of one electric motor. The vehicle may include at least one driver brake pedal sensor configured to provide an output indicative of the driver brake pedal demand and/or at least one driver acceleration pedal sensor configured to provide an output indicative of driver acceleration pedal demand, and the control means may be further adapted to: determine a desired amount of regenerative braking for the first and second electric motors based on driver brake pedal demand and/or lift-off of the driver acceleration pedal; control the first and second electric motors to apply the desired amount of regenerative braking; and in the event of a failure of one of the first and second electric motors, control the other electric motor to apply an amount of driving torque thereby applying a differential torque to the first and second rearwardly positioned wheels and reducing a yaw rate error due to the failure of one electric motor.

Advantages of at least some of the embodiments of the present invention are that understeer and/or oversteer of a vehicle can be corrected, allowing the vehicle to negotiate a corner with the driver-desired yaw-rate, even in a condition of mild or deep saturation of the front tyres, up to a yaw-rate value which can be also larger than the maximum yaw-rate allowed by the road coefficient of adhesion.

A desired yaw-rate can be achieved with minimal energy dissipation. A desired yaw-rate can be achieved with minimal negative intrusiveness to the driver. Negative intrusiveness to the driver is commonly associated with a) a sudden change in longitudinal vehicle velocity (jerk) as for instance caused by the application of individual wheel braking in commercial stability controllers, or b) an excessive corruption in driver steering feedback as for instance caused by the application of large control road wheel angles in Active Front Steering devices.

A desired yaw-rate can be achieved also when the two motors are also used for providing traction or for regenerative braking. This allows maximisation of the traction support and of the amount of regenerative braking which can be provided by the motors when the vehicle is negotiating a corner.

A desired yaw rate can be achieved without risk of jeopardising stability. A desired yaw rate can be achieved also in the event of failure of one motor.

Embodiments of the present invention will now be described by way of example and with reference to the accompanying drawings in which:

FIG. 9 is a schematic diagram of the single-track model and equations used to observe vehicle states;

FIG. 14 shows exemplary applications of motor torques to compensate for weight transfers and for failing modes occurring whilst motors are also used for regenerative braking and for traction support.

The system described here has particular application in vehicles using at least two independently controllable electric motors for providing direct driving torque to the rear wheels of the vehicle. These electric motors may be provided in conjunction with a separate drive system for at least the front wheels of the vehicle using an internal combustion engine and conventional mechanical drive train such as in a front wheel drive (FWD) vehicle. The simplest integration is with the electric motors only providing the yaw-control functionalities, but they can also be used to provide launch support and regenerative braking, and they can also be adapted to provide traction in a fully integrated parallel hybrid management system. The system is also applicable to a series hybrid RWD vehicle in which an internal combustion engine is used to provide electrical power for charging a battery and for an electric drive train. The system is also applicable to RWD vehicles that are purely electric, having no internal combustion engine. The electric motors may be inboard motors or in-wheel motors.

Figure 1:
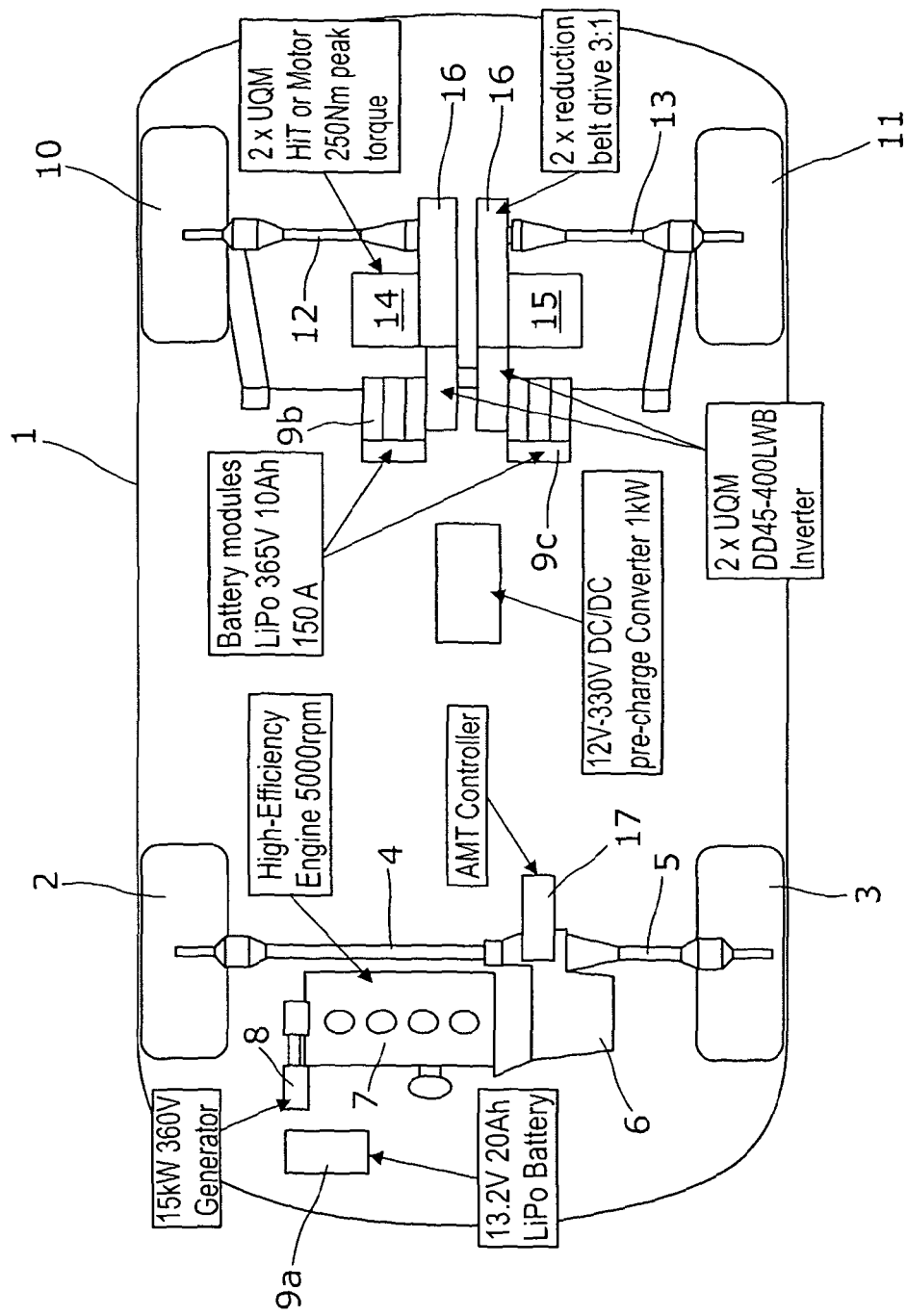
FIG. 1 shows a schematic plan view of drive train components of a vehicle.

FIG. 1 shows an exemplary hybrid vehicle into which the yaw control system is installed. Vehicle 1 includes a pair of forwardly positioned wheels 2, 3 which are coupled via drive shafts 4, 5 to a gearbox 6 and a conventional internal combustion engine 7. The engine 7 is also coupled to a generator 8 suitable for providing electrical power to the vehicle control systems, and to one or more electrical energy storage devices such as batteries 9a, 9b and 9c. Rearwardly positioned wheels 10, 11 are coupled via drive shafts 12, 13 to separate respective, independently controllable, electric motors 14, 15 for applying torque to the wheels 14, 15, via respective drive belts 16 or other drive trains. The battery 9a may be configured for storing charge for conventional vehicle functions such as energising a starter motor and providing power to electrical control, lighting and support systems whereas the batteries 9b and 9c may be interconnected to form a common battery pack sharing a common management system, and may be configured for storing charge for providing power to the electric motors 14, 15.

Figure 2:
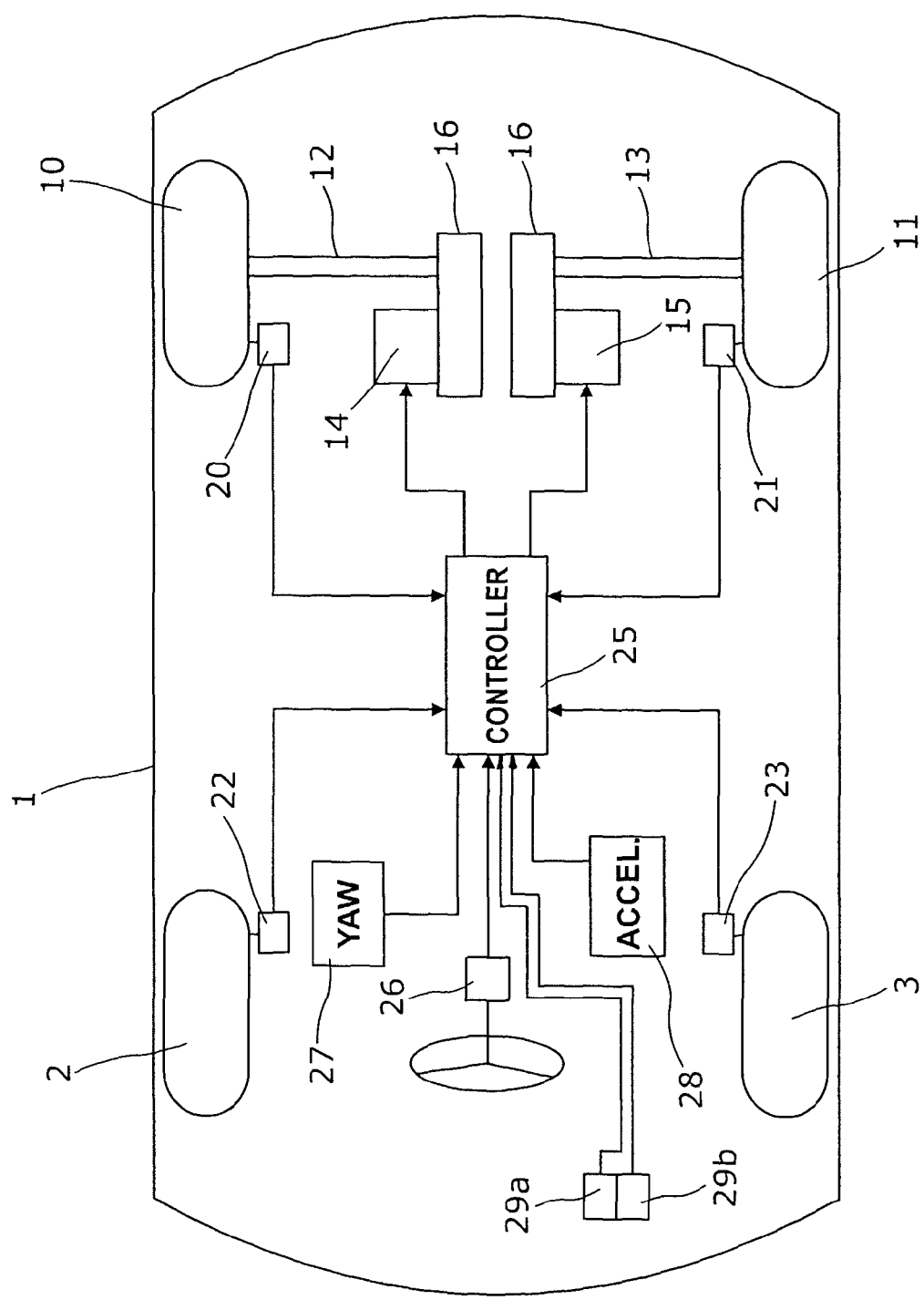
FIG. 2 shows a schematic plan view of control components of the vehicle of FIG. 1.

FIG. 2 shows a schematic view of the control system of the exemplary hybrid vehicle of FIG. 1. Wheel speed sensors 20, 21, 22, 23 are each configured to provide an output indicative of the speed of rotation of the respective road wheel 10, 11, 2, 3. Any suitable sensor may be used capable of indicating the rotational speed of the wheel and the sensors may be provided as part of another system, such as an antilock braking system, for example. Each of the wheel speed sensors 20-23 is coupled to a controller 25. As an alternative, or in addition, any vehicle speed sensor may be used that is configured to provide an output indicative of the vehicle's longitudinal speed. A driver's steering wheel also referred to herein as the hand-wheel is provided with a hand-wheel angle sensor 26 configured to provide an output indicating the angle of rotation of the hand-wheel 24 relative to a reference position. The hand-wheel sensor is configured to provide an indication of the angle of the steering road wheels 2, 3. In addition, or as an alternative, any sensor which is capable of providing an output indicative of the angle of steering road wheels 2, 3 could be used, such as a steering rack displacement sensor or the like. The angle sensor may comprise several sensors and may provide an average angle of the pair of steering road wheels. The output of the hand-wheel angle sensor 26 is also coupled to the controller 25. A vehicle yaw-rate sensor 27 is configured to provide an output indicating the vehicle's measured yaw-rate. The yaw-rate sensor 27 measures the vehicle's angular velocity around its vertical axis and may be of any suitable known type such as a piezoelectric sensor or a micromechanical sensor. The yaw-rate sensor 27 is also coupled to the controller 25. An accelerometer 28 is configured to provide an output indicating the lateral acceleration and the longitudinal acceleration of the vehicle and may be of any suitable known type, such as a piezoelectric sensor or micro electro-mechanical sensor. A driver acceleration pedal travel sensor 29a and/or a brake pedal sensor 29b may also be coupled to the controller 25 for respectively providing outputs indicating the driver acceleration pedal demand and the driver brake pedal demand.

In operation of the yaw control system, the controller 25 is configured to receive the outputs from each of the sensors 20-23, 26, 27 and 28, to determine relevant attributes of the vehicle's disposition therefrom, and to provide an actuation command to motors 14, 15.

Figure 10:
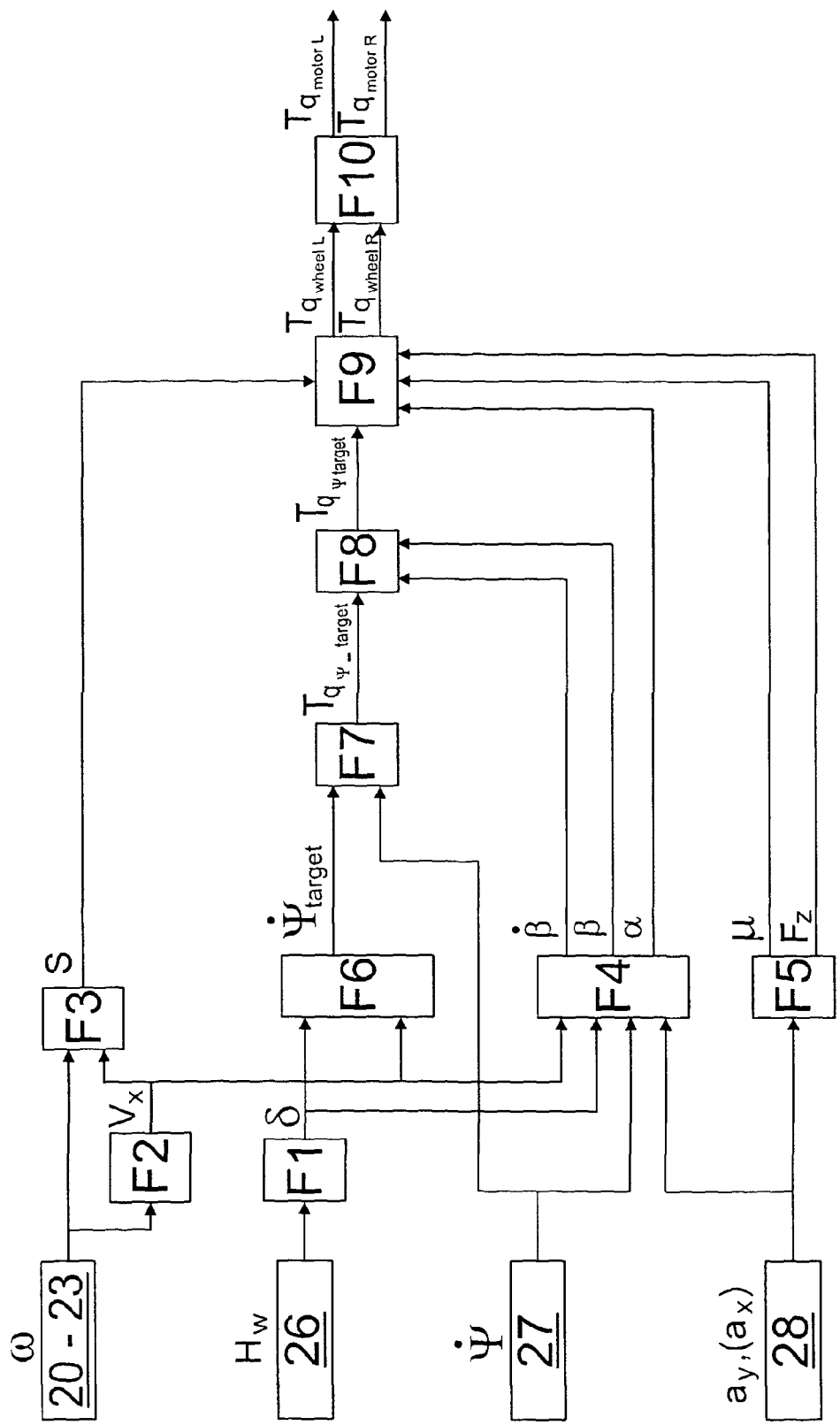
FIG. 10 is a schematic block diagram illustrating the signal flows in a controller from sensors to motor requests.

An exemplary signal flow in controller 25 is indicated in the schematic block diagram of FIG. 10. Function block F1 determines road wheel angle δ from hand-wheel angle Hw sensor 26 and known steering ratio (or from an alternative sensor as previously described). Function block F2 determines the longitudinal velocity $v_x$ of the vehicle from at least one of the wheel rotational velocity speed sensors 20-23 and known vehicle and wheel geometry. Function block F3 determines the longitudinal slip s of at least one of the rear wheels from at least rear wheel rotational velocity, vehicle longitudinal velocity $v_x$ and known vehicle and wheel geometry. Function block F4 determines the vehicle side-slip velocity dβ, side-slip angle β and wheel lateral slips α from at least road wheel angle δ, vehicle longitudinal velocity $v_x$ and known vehicle and tyre parameters, according to the equations of observed vehicle state as given in FIG. 9. Measured lateral acceleration $a_y$ and measured yaw-rate are also commonly used, either for compensating the observer error (e.g. Luenberger observer, Kalman Filter) and/or for direct integration. Function block F5 determines the road coefficient of adhesion μ and wheel vertical force Fz from at least lateral acceleration $a_y$ and known vehicle parameters. Function block F6 determines target yaw rate $d\psi_{target}$ from road wheel angle δ, vehicle longitudinal velocity $v_x$ and known vehicle parameters. Function block F7 determines a desired corrective yaw torque $Tq_{\psi\_target}$ based upon the deviation of measured yaw-rate dψ from target yaw-rate $d\psi_{target}$, also referred to herein as yaw-rate error. Function block F8 conditions the desired yaw torque $Tq_{\psi\_target}$ to take into account also vehicle side-slip velocity dβ and vehicle side-slip angle β. Function block F9 determines the desired wheel torque on each of the two rear wheels $Tq_{wheel\_L}$, $Tq_{wheel\_R}$ within the physical boundaries. Function block F10 determines the torque $Tq_{motor\_L}$, $Tq_{motor\_R}$ at which each of the two electric motors 14, 15 will be controlled.

It should be noted that this partition of block of functions is only one of the many possible, as in fact such functions can be intertwined or partitioned further, so that at the end many equivalent layouts can be used. Also, depending on the sensors adopted, additional functions for signal conditioning (e.g. offset removal, filtering) may also be used in the implementation.

The controller 25 is configured to determine the longitudinal velocity of the vehicle from the output of one or more of the speed sensors 20-23 using any suitable algorithm. The longitudinal velocity ($v_x$) is the velocity of the vehicle in the direction of its longitudinal axis, i.e. forwards or backwards and may be calculated from a single speed sensor 20-23 or from multiple speed sensors 20-23, e.g. as an average of the rotational speeds of all wheels or a pair of wheels, and more preferably as an average of only the front wheels. Speed sensors can be also located on the driveline.

Vehicle velocity from front wheel rotational speeds $\omega_F$ may be calculated according to the expression:

$$v_{F(L,R)} = \left[\omega_{F(L,R)} * R_{F(L,R)} \pm \dot{\psi}\left(\frac{tr_F}{2} \mp a*\beta\right)\right] * \frac{1}{\cos(\delta_F - \beta)}$$

Vehicle velocity from rear wheel rotational speed $\omega_R$ may be calculated according to the expression:

$$v_{R(L,R)} = \left[\omega_{R(L,R)} * R_{R(L,R)} \pm \dot{\psi}\left(\frac{tr_R}{2} \pm b*\beta\right)\right] * \frac{1}{\cos\beta}$$

where a is the longitudinal separation of the front wheels from the vehicle Centre of Gravity G, b is the longitudinal separation of the rear wheels from the vehicle centre of gravity G, β is the side slip angle, dΨ is the measured yaw-rate, $\delta_F$ is front road wheel angle, all as shown in FIG. 9. R is the wheel radius and $tr_{F,R}$ is the vehicle track (front and rear).

For tight trajectories vehicle side-slip β may be used, otherwise computation can be simplified and only yaw-rate used. Integration of the acceleration allows a fifth estimate for the vehicle velocity, useful during transients with all the four wheels locked, or in the case of deep tyre lateral saturation. Acceleration signals can be pre-processed in the direction of travel of the vehicle, e.g. with slight geometrical simplification:

$$v_x = \int(a_x + a_y * \sin\beta)$$

It is also possible to use a GPS signal to determine vehicle longitudinal speed or to back-up a computation based on wheel speeds during highly non-linear transients; the GPS signal may also provide information on the vehicle heading.

Any suitable speed estimation algorithm may be used, as open loop fusion of signals above discussed, or corrected in closed loop (e.g. Luenberger observer, Kalman Filter), or determined with a fuzzy logic.

The controller 25 is also configured to determine a target yaw-rate $d\dot{\psi}_{trgt}$ of the vehicle using the output of the hand-wheel angle sensor 26. This can be achieved with a hand-wheel sensor 26 that determines the absolute position $HW_{angle}$ of the hand-wheel, given a known ratio $\tau$, i.e. $\delta_F = \tau * HW_{angle}$. Alternatively, any other sensor or sensors placed on the steering system which can be used to determine the road-wheel angle $\delta_F$ may be used e.g. a sensor measuring the rack displacement or directly measuring the road wheel angle. If a relative position sensor, rather than an absolute position sensor is used, a strategy for compensating the offset must be used during initialisation, e.g. by determining and compensating for the value averaged over a few seconds in a straight driving condition.

The transfer function between road-wheel angle and yaw rate is determined based on the dynamics of the single track model of FIG. 9:

$$\begin{cases} F_{yF}\cos\delta_F + F_{yR} = ma_y \\ F_{yF}\cos\delta_F * a + F_{yR} * b = J_z\ddot{\psi} \end{cases}$$

With the hypothesis of small $\delta F$:

$$\begin{cases} F_{yF} + F_{yR} = ma_y \\ F_{yF}a + F_{yR}b = J_z\ddot{\psi} \end{cases}$$

Considering linear tyre stiffness characteristics $C_{\alpha f}$ and $C_{\alpha f}$ lateral forces are:

$$\begin{cases} F_{yF} = C_{\alpha F}*\alpha_F = C_{\alpha F}*\left(\delta_F - \frac{v_y + a\dot{\psi}}{v_x}\right) \\ F_{yR} = C_R*\alpha_R = C_{\alpha R}*\left(-\frac{v_y - b\dot{\psi}}{v_x}\right) \end{cases}$$

the equations of motion rewritten in a state-space matrix notation of the two state variables lateral velocity $v_y$ and yaw-rate $\dot{\psi}$ is:

$$\begin{bmatrix} \dot{v}_y \\ \ddot{\psi} \end{bmatrix} = \begin{bmatrix} -\frac{(C_{\alpha F}+C_{\alpha R})}{mv_x} & -\frac{(l_FC_{\alpha F}-l_RC_{\alpha R})}{mv_x}-v_x \\ -\frac{(l_FC_{\alpha F}-l_RC_{\alpha R})}{v_xJ_z} & -\frac{(l_F^2C_{\alpha F}+l_R^2C_{\alpha R})}{v_xJ_z} \end{bmatrix}\begin{bmatrix} v_y \\ \dot{\psi} \end{bmatrix} + \begin{bmatrix} \frac{C_{\alpha F}}{m} \\ \frac{l_FC_{\alpha F}}{J_z} \end{bmatrix}\delta_F$$

The general equation of motion in the space-state can be written:

$$\underline{\dot{x}} = A\underline{x} + Bu$$

$$\underline{y} = C\underline{x} + Du$$

Using as state-variables vector $\underline{x} = \{v_y, \dot{\psi}\}$, as input variable $u = \{\delta_F\}$ and as generic output vector $\underline{y}$:

$$\underline{y} = \begin{bmatrix} a_y \\ \dot{\psi} \\ \beta \end{bmatrix} = \begin{bmatrix} \dot{v}_y + v_x\dot{\psi} \\ \dot{\psi} \\ v_y/v_x \end{bmatrix}$$

state-space ices will be defined as:

$$A = -\begin{bmatrix} \frac{C_{\alpha F}+C_{\alpha R}}{mv_x} & \frac{aC_{\alpha F}-bC_{\alpha R}}{mv_x}+v_x \\ \frac{aC_{\alpha F}-bC_{\alpha R}}{J_zv_x} & \frac{a^2C_{\alpha F}+b^2C_{\alpha R}}{J_zv_x} \end{bmatrix},$$

$$B = \begin{bmatrix} \frac{C_{\alpha F}}{m} \\ \frac{aC_{\alpha F}}{J_z} \end{bmatrix},$$

$$C = \begin{bmatrix} -\frac{C_{\alpha F}+C_{\alpha R}}{mv_x} & -\frac{aC_{\alpha F}-bC_{\alpha R}}{mv_x} \\ 0 & 1 \\ \frac{1}{v_x} & 0 \end{bmatrix},$$

$$D = \begin{bmatrix} \frac{C_{\alpha F}}{m} \\ 0 \\ 0 \end{bmatrix}$$

The steady state solutions are:

$$\underline{y} = \begin{cases} a_y = \frac{v_x^2}{l+K_{us}v_x^2}*\delta_F \\ \dot{\psi} = \frac{v_x}{l+K_{us}v_x^2}*\delta_F \\ \beta = \frac{b-\frac{ma}{2C_{\alpha R}l}v_x^2}{l+K_{us}v_x^2}*\delta_F \end{cases}$$

With $$K_{us} = \frac{mb}{lC_{\alpha F}} - \frac{ma}{lC_{\alpha R}} = \frac{m}{lC_{\alpha F}C_{\alpha R}}*(bC_{\alpha R}-aC_{\alpha F})$$

Using the steady state transfer function above, the target yaw-rate profile $d\dot{\psi}_{trgt}$ is determined from the road-wheel angle $\delta_F$ and vehicle longitudinal speed $v_x$ and from known vehicle geometrical characteristics such, wheelbase $l=a+b$ and from tuneable parameters such as target vehicle understeering gradient $K_{trgt}$ according to a law which can be related to the dynamics of the single track model:

$$\dot{\psi}_{trgt} = \frac{v_x}{l+K_{us\_trgt}v_x^2} \cdot \delta_F$$

or equivalently, the characteristic speed definition can be used: $v_{ch} = \sqrt{l*g/K_{us}}$ The characteristic speed for the baseline vehicle can be found measuring yaw rate and road wheel angle in driving constant speed cornering. Its first approximation can be determined from the chassis parameters of FIG. 9:

$$v_{ch} = \sqrt{\frac{C_{\alpha F} C_{\alpha R}(a+b)^2}{m(bC_{\alpha R} - aC_{\alpha F})}}$$

So the target yaw rate can be written:

$$\dot{\psi}_{trg} = \frac{v_x}{l} \cdot \frac{1}{1+(v_x/v_{ch\_trg})^2} \cdot \delta_F$$

An alternative way to express the target yaw rate is using lateral acceleration:

$$\dot{\psi}_{trg} = \frac{v_x \delta_F}{l} - \frac{v_x}{l} * K_{us\_trgt} * a_y$$

Alternatively, the target yaw rate $d\psi_{trgt}$ can be also determined by a target model in the form of FIG. 9 or a more complex model, with the vehicle and tyre parameters tuned accordingly to the desired understeer gradient.

Figure 3:
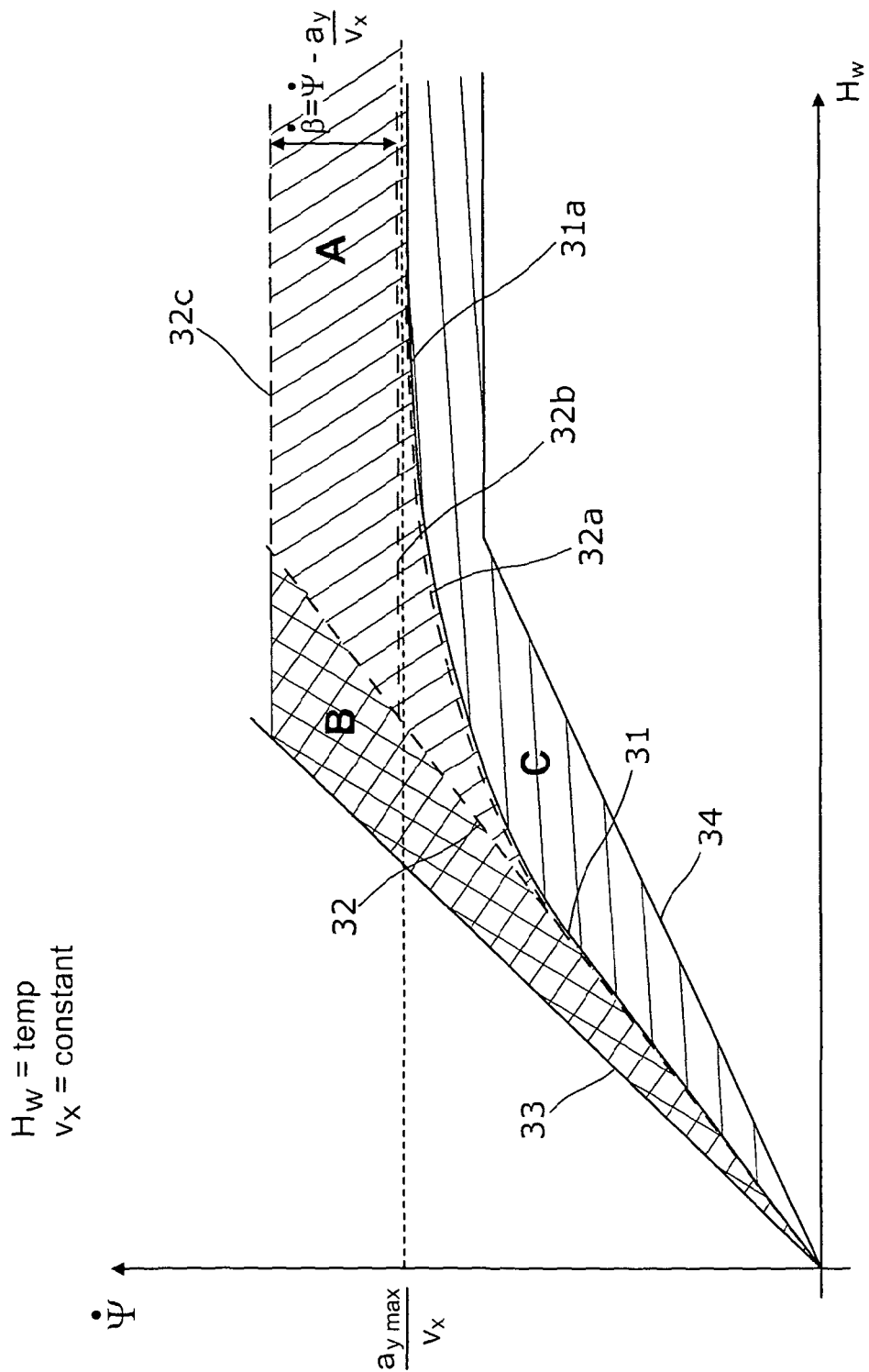
FIG. 3 shows a graph of a vehicle control envelope terms of an achievable yaw-rate ($d\psi/dt$) for a given hand wheel angle Hw.

In FIG. 3, a steering ramp at constant vehicle velocity is shown, relating hand-wheel angle to measured yaw-rate. For reference, the yaw-rate of the baseline vehicle is shown at line 31, where the non-linearity occurs due to the saturation of front tyres in developing lateral force at 31a. The yaw-rate target will be linear with the hand-wheel angle if constant parameters are used in the equation, which corresponds to using linear tyre cornering stiffness in the model of FIG. 9. The tuneable parameters can be chosen to obtain a target (line 32) matching the baseline vehicle behaviour in the linear region, or to provide a higher target (line 33) or a lower target (line 34). The target can be scaled with lateral acceleration to match with the baseline vehicle also in the non-linear area 32a, or it can be saturated to the maximum available yaw-rate allowed by the road coefficient of adhesion $\mu*g/v_x$ (line 32b). A target above the maximum available yaw-rate allowed by the coefficient of friction can be also chosen (line 32c). As a result, the control envelope of the target yaw-rate is the shaded area between lines 33, 32c and 34. Thus, in a general aspect, the controller 25 may be adapted to determine a target yaw rate which is larger in magnitude than a maximum yaw rate allowed by the road coefficient of adhesion and to deliberately increase vehicle side-slip angle beyond that which the vehicle would otherwise adopt without the intervention of the controller while still maintaining stability.

Given the ability of the system to compensate for understeer, target profile matching the linear baseline behaviour (area A) or higher (area B) are preferably assigned, however also a target lower than baseline is achievable (area C)

The controller 25 of FIG. 2 is also configured to use the output of yaw-rate sensor 27 to determine a measured or actual yaw-rate $d\psi$ which it then compares with the target yaw-rate $d\psi_{trgt}$ to determine a difference, or yaw-rate error, therebetween. The difference between the target yaw-rate and the measured yaw-rate is a way to determine the amount of understeer or oversteer. The vehicle will be considered as oversteering or understeering depending on whether the magnitude of measured yaw-rate dip is greater than, or smaller than, the magnitude of the target yaw-rate.

Oversteering if:

$$\dot{\psi}_{err} = abs(\dot{\psi}_{meas}) - abs(\dot{\psi}) > 0$$

Understeering if:

$$\dot{\psi}_{err} = abs(\dot{\psi}_{meas}) - abs(\dot{\psi}_{trgt}) < 0$$

Referring to FIG. 3, given the baseline profile 31, if the target 32 is chosen, the vehicle will be considered understeering when, due to the saturation of the front tyres, the yaw-rate of the baseline vehicle starts to saturate.

This is a simple way to determine understeer or oversteer using a reference model. Depending on the complexity of the reference model, alternative ways to determine the understeer or oversteer of the vehicle may be used, for instance comparing estimated and target tyre lateral slips, or tyre lateral forces. In this case estimation (or measurement) and target value for the side-slip angle are also needed, using a model with the form of FIG. 9 or a more complex one.

Another definition of understeer and oversteer is based on the sign of the understeer coefficient $K_{us}$. Positive sign of ($bC_{\alpha R} - aC_{\alpha F}$) dictates that during cornering the front slip angle is greater than the rear slip angle and hand-wheel angle needs to be increased when vehicle speed is increased in cornering from a steady state condition.

The controller 25 is configured to determine the nominal corrective yaw moment needed to correct or reduce the deviation of the measured yaw-rate from the target yaw rate. In one implementation, a proportional-integral-derivative (PID) feedback control loop is used:

$$\Delta Tq_{yaw\_trgt} = P(\dot{\psi}_{meas} - \dot{\psi}_{trgt}) + I(\dot{\psi}_{meas} - \dot{\psi}_{trgt}) + D(\dot{\psi}_{meas} - \dot{\psi}_{trgt})$$

An alternative way to compute a nominal corrective yaw moment is based on the PID of the error between a target yaw torque (determined from yaw inertia $J_Z$ and target yaw acceleration $dd\psi_{trgt}$), and the estimated yaw torque from an observer as in FIG. 9 or more complex:

$$\Delta Tq_{yaw\_trgt} = P(Tq_{observer} - J_Z\ddot{\psi}_{trgt}) + I(Tq_{observer} - J_Z\ddot{\psi}_{trgt}) + D(Tq_{reference} - J_Z\ddot{\psi}_{trgt})$$

As another alternative computation, the equations of FIG. 9 can be used to describe the target vehicle model, and the actual vehicle yaw torque can be calculated by multiplying vehicle yaw inertia $J_Z$ by vehicle yaw acceleration (either directly measured or calculated as the derivative of measured vehicle yaw rate) so as to determine the nominal corrective yaw moment:

$$\Delta Tq_{yaw\_trgt} = P(J_Z\ddot{\psi}_{meas} - Tq_{trgt}) + I(J_Z\ddot{\psi}_{meas} - Tq_{trgt}) + D(J_Z\ddot{\psi}_{meas} - Tq_{trgt})$$

The feedback control loop of measured yaw rate against target yaw rate, or of measured yaw moment against target yaw moment, can be designed using a number of control theories of different complexity and performance such as, for example, PID control, feedback linearization, backstepping, sliding mode control.

To further improve reference tracking performance, a feed-forward term can also be added to the feedback control loop based, for instance, on the model-based prediction of the vehicle yaw torque variation to driver hand-wheel angle determined using the equations of FIG. 9.

The line 32b of FIG. 3 defines steady state stable condition at maximum lateral acceleration $a_{y\_max}$.

In the steady state solutions for the single track model, substituting maximum lateral acceleration we obtain the following values of maximum yaw rate and maximum side-slip angle:

$$\dot{\psi}_{max} = \frac{a_{y\_max}}{v_x} = \frac{\mu * g}{v_x}$$

$$\beta_{max} = \frac{b}{v_x^2} * a_{y\_max} + K_\beta * a_{y\_max} = \left(\frac{b}{v_x^2} + K_\beta\right) * \mu * g$$

With the side-slip gradient defined as:

$$K_\beta = -\frac{m*a}{2*(a+b)*C_{\alpha R}}$$

When a target yaw-rate such as 32c in FIG. 3 is used, $$\dot{\psi}_{trgt} > \frac{\mu * g}{v_x}$$

$$\Delta Tq_{yaw\_trgt} = P(\dot{\psi}_{meas} - \dot{\psi}_{trgt}) + I(\dot{\psi}_{meas} - \dot{\psi}_{trgt}) + D(\ddot{\psi}_{meas} - \ddot{\psi}_{trgt})$$

as effect of control yaw torque, yaw rate is increased and the side slip velocity is forced to be positive:

$$\dot{\beta}_{meas} = \dot{\psi}_{meas} - \frac{\mu * g}{v_x} > 0;$$

Figure 7:
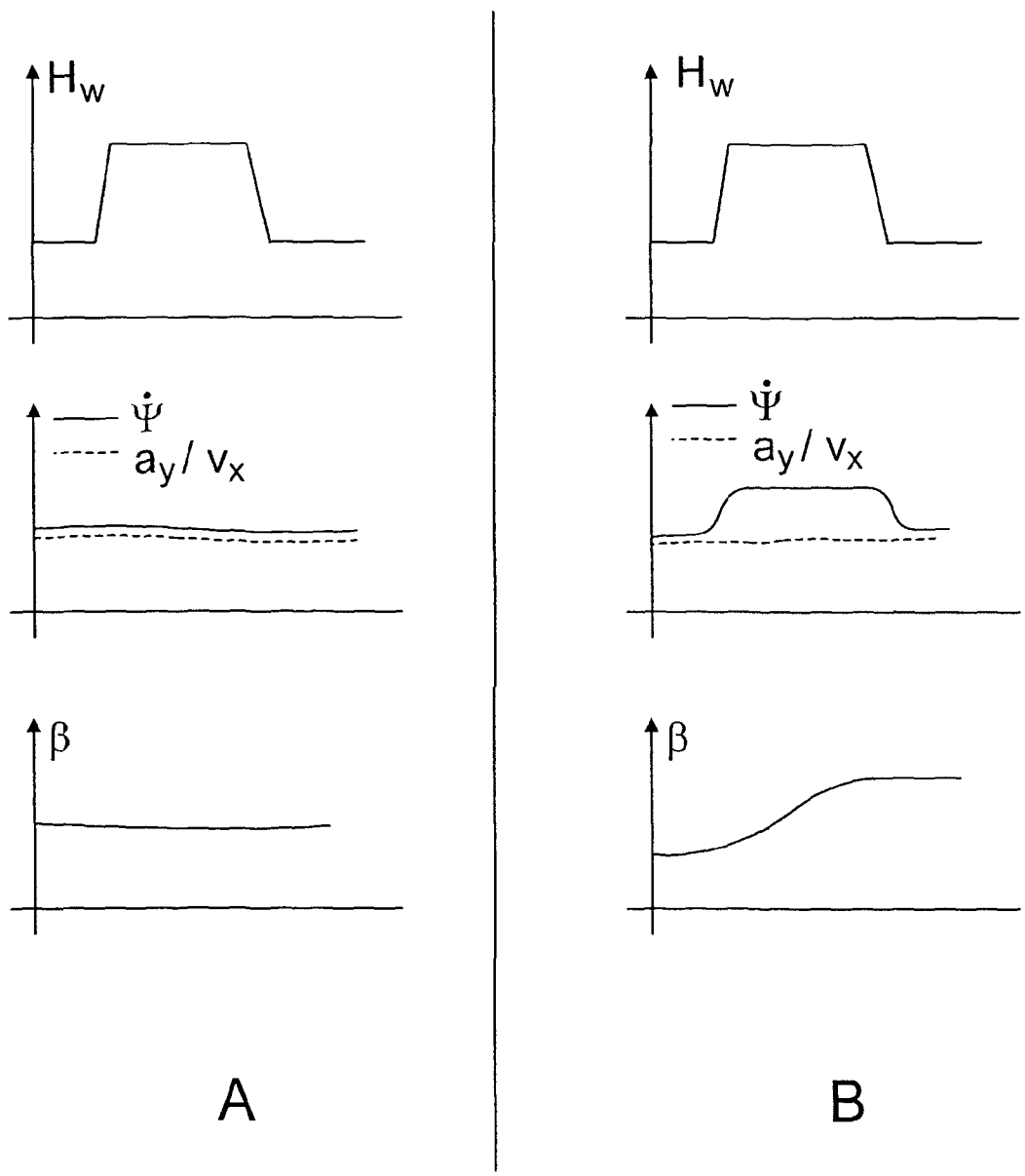
FIG. 7 shows the control envelope as achievable vehicle response during severe understeer.

As a consequence, the vehicle will build side slip angle above the stable $\beta_{max}$ (FIG. 7) until the driver reduces the steering command, and consequently the target yaw rate, and so regains the steady state position. This behaviour of the control means relies on the target being set at a higher value than the stable default value, so it should be only enabled upon driver request. In a typical implementation the possibility to use this higher target yaw rate is associated with a different driving mode which the driver can select using a purposely built mode selector. In another implementation, a driving recognition scenario for the target yaw rate to be moved from line 32b to 32c could be the combination of:
1) driver hand-wheel larger than a value $\delta_{drift}$ at which maximum acceleration is reached (intersection lines 32 and 32b) given by:

$$\delta_{drift} > \frac{\mu * g}{v_x^2}(l + K_{us} * v_x^2)$$

2) driver giving a full throttle input.

During transients, the dynamic yaw rate $d\psi_{dyn}$ may be in general described by multiplying the steady-state yaw rate $d\psi_{ss}$ by a dynamic transfer function; such dynamic transfer function may be described as $G(j\omega)$ in a complex angular frequency domain, or as $G(s)$ as Laplace transform:

$$\frac{\dot{\psi}_{dyn}}{\delta_F}(j\omega) = \frac{\dot{\psi}_{ss}}{\delta_F} * G(j\omega)$$

Or equivalently:

$$\frac{\dot{\psi}_{dyn}}{\delta_F}(s) = \frac{\dot{\psi}_{ss}}{\delta_F} * G(s)$$

The yaw rate dynamic transfer function may be determined from the theory of the single-track vehicle model of FIG. 9, which is a second order system whose transient behaviour to input front road-wheel angle $\delta_F$ can be described using the state space notation in the two state variables lateral velocity $v_y$ and yaw-rate $d\psi$ as discussed above. Therefore, one method to describe the dynamic of yaw rate rate $d\psi$ to input of road-wheel angle $\delta_F$ is by approximating it with a second order differential equation of the form:

$$\frac{d^2}{dt^2}\psi(t) + 2*\zeta*\omega_0*\frac{d}{dt}\psi(t) + \omega_0^2*\psi(t) = \dot{\psi}_{ss}*\omega_0^2*\delta_F(t)$$

Where:
$d\psi_{ss}$ is the steady-state yaw rate, determining the size of the response when the input settles to a constant value;
$\xi$ is the damping ratio, determining how much the system oscillates as the response decays towards the steady state;
$\omega_0$ is the undamped natural frequency, determining how fast the system oscillates during any transient response;

Then, Laplace transforming both sides, we find the transfer function to be:

$$\frac{\dot{\psi}}{\delta_F}(s) = \frac{\dot{\psi}_{ss}}{\delta_F} * G(s)$$

With:

$$G(s) = \frac{\omega_0^2}{s^2 + 2*\omega_0*\zeta*s + \omega_0^2}$$

Expression of damping ratio and undamped natural frequency in terms of model Parameters may be obtained with some approximation, from the formulas:

$$\omega_0^2 = \left(\frac{C_{\alpha F} + C_{\alpha R}}{m * v_x}\right) * \left(1 + \frac{K_{us}}{l}v_x^2\right)$$

$$\zeta = \frac{1}{\sqrt{1 + \frac{K_{us}}{l}*v_x^2}}$$

In another implementation, the second order differential equation describing the dynamic of yaw rate $d\psi$ to input of road wheel angle $\delta_F$ may be determined by combining the two equations of the state space notation, and by eliminating the state variable lateral velocity $v_y$:

$$m^2*k^2*v_x^2*\frac{d^2}{dt^2}\psi(t) + m*C*(q^2+k^2)*v_x*\frac{d}{dt}\psi(t) +$$
$$(C_{\alpha F}*C_{\alpha R}*l^2 - m*v_x^2*C*h)*\dot{\psi}(t) ==$$
$$m*v_x^2*a*C_{\alpha F}*\frac{d}{dt}\delta(t) + v_x*C_{\alpha F}*C_{\alpha R}*l*\delta(t)$$

Where, for simplicity, the following quantities are introduced:

$$C = C_{\alpha F} + C_{\alpha R}$$

$$C*h = a*C_{\alpha F} + b*C_{\alpha R}$$

$$C*q^2 = a^2*C_{\alpha F} + b^2*C_{\alpha R}$$

$$m*k^2 = J_z$$

By substituting the expressions of natural frequency and damping ratio in function of model parameters, and using the definition of the steady-state yaw-rate $d\psi_{ss}$, the frequency response transfer function can be derived:

$$\frac{\dot\psi}{\delta_F}(j\omega) = \frac{\dot\psi_{ss}}{\delta_F} * G(j\omega)$$

$$G(j\omega) = \frac{1 - (2*v_x*K_\beta)j\omega}{1 - \left(\frac{\omega}{\omega_0}\right)^2 + 2\zeta\left(\frac{j\omega}{\omega_0}\right)}$$

where $G(j\omega)$ is the dynamic term of the yaw rate response and $K_\beta$ is the nominal vehicle side-slip gradient.

By using one of the two above implementations to determine the dynamic behaviour of the baseline vehicle, the baseline frequency response transfer function $G(j\omega)_{bas}$, or equivalently the baseline Laplace transformed transfer function $G(s)_{bas}$, has a second order dynamic described by its natural frequency $\omega_{o\_bas}$ and damping ratio $\xi_{bas}$. These entities may be either estimated from known vehicle parameters or, for a known steady state behaviour $d\psi_{ss\_bas}$, identified by measuring the frequency response of yaw rate $d\psi_{meas}$ to handwheel input $\delta_F$ in sinusoidal inputs manoeuvres at different speeds, so that:

$$\dot\psi_{bas}(j\omega) = \dot\psi_{ss\_bas}*G(j\omega)_{bas} = \dot\psi_{meas}(j\omega)$$

Or, in a Laplace transform notation:

$$\dot\psi_{bas}(s) = \dot\psi_{ss\_bas}*G(s)_{bas} = \dot\psi_{meas}(s)$$

Similarly, the dynamic behaviour of the target yaw rate may be described by its target frequency response transfer function $G(j\omega)_{trgt}$, or equivalently by its target Laplace transformed transfer function $G(s)_{trgt}$, which is determined by target natural frequency $\omega_{0\_trgt}$ and damping ratio $\xi_{trgt}$:

$$\dot\psi_{trgt}(j\omega) = \dot\psi_{ss\_trgt}(K_{trgt})*G(j\omega)_{trgt}$$

Or, in a Laplace transform notation:

$$\dot\psi_{trgt}(s) = \dot\psi_{ss\_trgt}(K_{trgt})*G(s)_{trgt}$$

The target transfer function $G(j\omega)_{trgt}$ (or $G(s)_{trgt}$) is determined by the controller. Since the dynamic target yaw-rate doesn't need to coincide with the baseline vehicle, in one implementation no dynamics are associated with the target yaw-rate, i.e. it has no phase lag with respect to hand-wheel input:

$$\dot\psi_{trgt}(j\omega) = \dot\psi_{ss\_trgt}(K_{trgt})*G(j\omega)_{trgt} \cong \dot\psi_{ss\_trgt}(K_{trgt}),$$

i.e. $G(j\omega)_{trgt} = 1$

Or, using a Laplace transform notation:

$$\dot\psi_{trgt}(s) = \dot\psi_{ss\_trgt}*G(s)_{trgt} \cong \dot\psi_{ss\_trgt}$$

i.e. $G_{trgt}(s) = 1$

In another implementation, the same baseline second order dynamic can be associated to match the baseline vehicle dynamic response:

$$\dot\psi_{trgt}(j\omega) = \dot\psi_{bas}(j\omega), \text{ i.e. } G(j\omega)_{trgt} \approx G(j\omega)_{bas}$$

Or, using a Laplace transform notation:

$$\dot\psi_{trgt}(s) = \dot\psi_{bas}, \text{ i.e. } G_{trgt}(s) \approx G_{bas}(s)$$

In general, any stable combination of natural frequency $\omega_{0\_trgt}$ and damping ratio $\xi_{trgt}$ can be chosen for the target.

When a target with conveniently small phase lag is chosen, then a yaw rate error is generated even though the static target yaw rate may coincide with the static baseline vehicle yaw rate (e.g. lines 31 and 32a in FIG. 3)

$$\dot\psi_{target\_static} = \dot\psi_{static}\dot\psi_{target\_static} \cong \dot\psi_{static}*G(s)$$

And consequently:

$$\Delta Tq_{yaw\_trgt} = P(\dot\psi_{meas}(s) - \dot\psi_{target\_static}) + I(\dot\psi_{meas}(s) - \dot\psi_{target\_static}) + D(\dot\psi_{meas}(s) - \dot\psi_{target\_static})$$

Figure 8A:
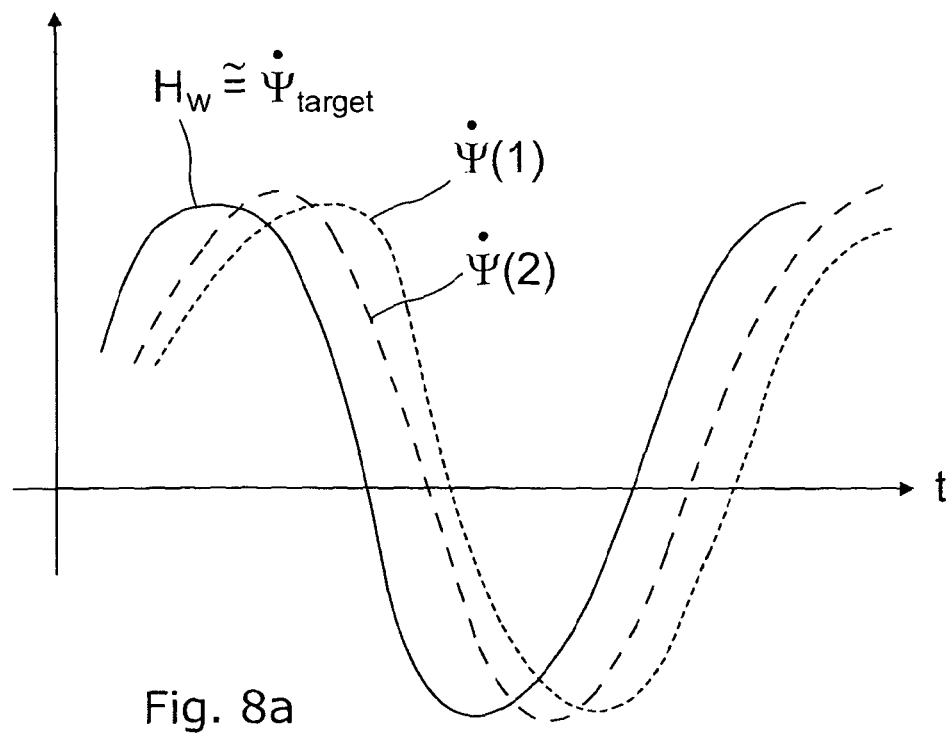
FIG. 8 shows the control envelope in dynamic manoeuvres as proved yaw damping and reduced lag.

This leads to the scenario of FIG. 8a, i.e. the action of the yaw torque is to reduce the phase delay between the handwheel command and the measured yaw-rate.

Similarly, if a combination of natural frequency $\omega_{0\_trgt}$ and damping ratio $\xi_{trgt}$ is chosen so that the target is more damped than the baseline, then the yaw torque will have the effect of reducing the yaw overshoot in a transient manoeuvre. The same effect is obtained if again the static target yaw rate is chosen also for transients, e.g. in a step steer as in FIG. 8b.

The choice of the target yaw-rate (static profile and dynamic behaviour) can be done on-board depending from the driving scenario. When an oversteer scenario is detected, in one conservative implementation it is possible to use the profile of line 32 and 32a of FIG. 3.

Yaw-motion controllers may consider also a second vehicle state, namely the side-slip angle β. The side-slip angle represents the angle between the direction of travel of the vehicle and the heading of the vehicle. Its definition is:

$$\beta = \frac{v_y}{v_x}$$

A second control loop for the side-slip angle may be implemented, comparing the estimated (or measured) value to a target determined either as a threshold or derived from a reference model.

In one implementation the control architecture adopts a pure yaw-rate control, i.e. a corrective yaw moment is generated by a closed-loop control of the measured yaw-rate against a target yaw-rate. In fact the system is very effective in tracking the yaw-rate error in an understeering event associated with saturation of front tyres, but has less authority in compensating a large deviation in side-slip, which is normally associated with a saturation of rear tyres. Therefore, in one implementation, side-slip velocity dβ and side-slip angle β are monitored and used to determine the boundaries of application of the corrective yaw moment deriving from yaw-rate control loop, but there is no direct closed loop control of dβ and β.

One possible way to set the dβ-β boundaries of application of corrective yaw moment is:

$$|d\beta| < d\beta_{threshold}$$

and/or $$|\beta| < \beta_{threshold}$$

and/or $$\left|\frac{\beta}{\beta_{threshold}} + \frac{\dot\beta}{\dot\beta_{theshold}}\right| < 1$$

Figure 4:
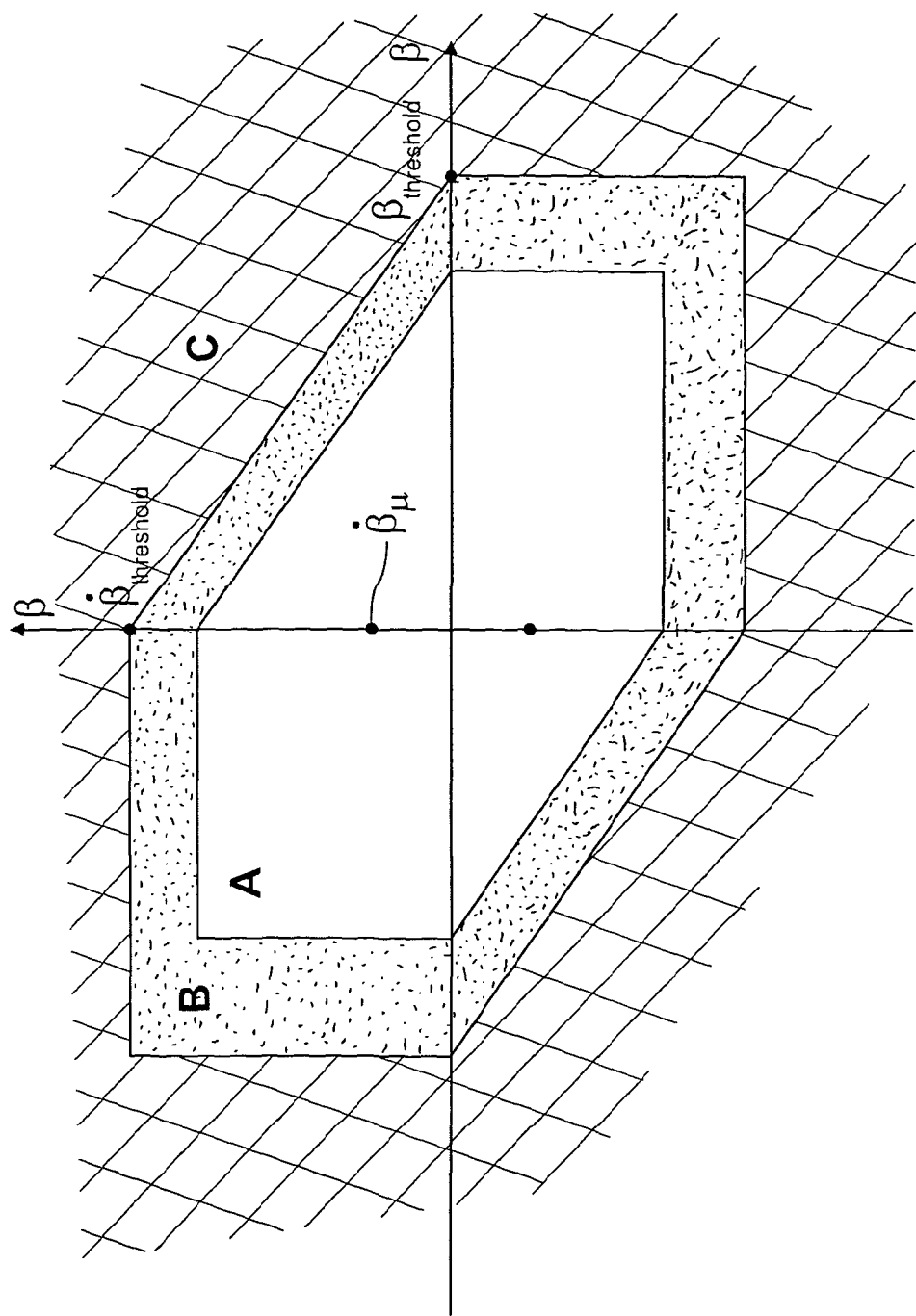
FIG. 4 shows the control envelope on a stability $\beta$-$d\beta$ phase plane.

When the three conditions above are used together, they define the area A in FIG. 4 in which the system can intervene without jeopardising stability. Area C is the instability area, i.e. the area where the baseline vehicle would not be able to restore the equilibrium without the intervention of the stability controller based on individual front wheel braking, if available. In this area the system should not be normally used alone.

The stability area A in FIG. 4 becomes smaller with increasing vehicle speed: this matches very well with the yaw authority of the system, which is limited by the constant power characteristic of the electric motors and therefore also becomes smaller with increasing vehicle speed. Rather than a limitation, this diminished authority at higher vehicle speeds can be therefore considered as an intrinsic safety feature of the system.

In the simplest implementation, dβ and β are monitored and used as thresholds and no closed-loop stabilisation yaw moment is determined upon them. In another implementation the controller 25 of FIG. 2 is also adapted to determine a stabilising yaw moment aimed to reduce β and dβ, for instance in the area B, i.e. before the instability area C is entered.

Side-slip velocity dβ, can be estimated from the observer of FIG. 9 or can be estimated from measured sensors output:

$$\dot{\beta} = \frac{a_y}{v_x} - \dot{\psi}$$

The preferred way to estimate the side-slip angle β is either through direct integration of measured side-slip velocity (preferred in short transients), or to use the value determined in the observer of FIG. 9 (best results in the linear region), or a fusion of the two methods. The β observer can be of different complexity, from open loop only, or corrected in closed loop (e.g. Luenberger observer, Kalman Filter) using measured yaw rate and lateral acceleration, or using a fuzzy logic. In this implementation a simple open loop model is used, and a direct integration is performed during the system intervention.

$$\beta_{obs} = \int_0^t \left(-\dot{\psi} + \frac{1}{mv_x}(F_{yF} + F_{yR})\right)dt$$

$$\beta = \beta_{obs} + \int_0^t \left(\frac{a_y}{v_x} - \dot{\psi}\right)dt$$

The threshold $\beta_{threshold}$ is designed to be scaled with vehicle speed, and tuned with on-vehicle tests. As initial value on dry asphalt:

$$\beta_{thrsld\_dry} = 10° - 7° * \frac{v_x^2}{(40 \text{ m/s})^2}$$

It also needs to be scaled with road μ:

$$\beta_{thrsld} = \beta_{thrsld\_dry} * \mu$$

In another implementation, when chassis parameters of FIG. 9 are known, the steady state solution may be also used as threshold:

$$\beta_{thrsld} = \left(\frac{b}{v_x^2} - \frac{m*a}{2*C_{\alpha R}*l}\right)*\mu*g$$

When the target line 32c of is used, the target yaw rate will have a value of:

$$\dot{\psi}_{trgt} = \frac{k_1 * a_{y\_max}}{v_x} = \frac{k_1 * \mu * g}{v_x}$$

With $k_1$ saturation coefficient, $k_1 > 1$

In this driving scenario a higher side-slip needs to e.g.:

$$\beta_{thrsld\_drift} = \beta_{thrsld} * k_3$$

With $k_3 > 1$.

In one implementation, when $|\beta| > \beta_{threshold}$ the control yaw torque will be ramped to zero $$\Delta Tq_{yaw\_trgt\_conditioned} = \Delta Tq(1 \to 0)*f(|\beta| - \beta_{thrld})$$

In another implementation, the threshold on side-slip angle is used by the control means to determine a closed-loop control yaw torque which is directly opposing the build of the side-slip angle. This control yaw torque is added to the control yaw torque generated by the yaw-rate target tracking, to form a resulting torque.

If $|\beta| > \beta_{threshold}$:

$$\Delta Tq_{yaw\_trgt\_\beta} = P(|\beta_{meas}| - \beta_{thrshld}) + I(|\beta_{meas}| - \beta_{thrshld}) + D(|\beta_{meas}| - \beta_{thrshld})$$

$$\Delta Tq_{yaw\_trgt\_conditioned} = \Delta Tq_{yaw\_trgt} + \Delta Tq_{yaw\_trgt\_\beta}$$

Threshold of side-slip velocity is also designed to be scaled with vehicle speed and road friction, and tuned with on-vehicle test. In one implementation:

$$\dot{\beta}_{thrsld\_max} = \left(20°/s - 14°/s * \frac{v_x^2}{(40 \text{ m/s})^2}\right)\mu$$

Side-slip velocity threshold may be differently set when target yaw rate is above the coefficient of adhesion. When the target yaw rate 32c of FIG. 3 is used, the side slip velocity threshold can be set with a gain $k_2$ respect to the value set by the yaw-rate target:

$$\dot{\beta}_{thrsld\_drift} \cong k_2 * (k_1 - 1) * \frac{\mu * g}{v_x}$$

$k_2$ initial value can be set to 1 and has to be tuned with on-vehicle testing.

In one implementation, when $|d\beta| > d\beta_{threshold}$
The control yaw torque will be ramped to zero $$\Delta Tq_{yaw\_trgt\_conditioned} = \Delta Tq(1 \to 0)*f(|d\beta| - d\beta_{thrld})$$

In another implementation, the threshold on side-slip velocity is used by the control means to determine a closed-loop control yaw torque which is directly opposing the increase of the side-slip velocity. This control yaw torque is added to the control yaw torque generated by tracking the yaw-rate to form a resulting torque. If $|d\beta| > d\beta_{threshold}$:

$$\Delta Tq_{yaw\_trgt\_d\beta} = P(|d\beta_{meas}| - d\beta_{thrshld}) + I(|d\beta_{meas}| - d\beta_{thrshld}) + D(|d\beta_{meas}| - d\beta_{thrshld})$$

$$\Delta Tq_{yaw\_trgt\_conditioned} = \Delta Tq_{yaw\_trgt} + \Delta Tq_{yaw\_trgt\_d\beta}$$

In another implementation, a mixed condition using at same time the two thresholds $\beta_{threshold}$ and $d\beta_{threshold}$ is given:

$$\text{When } \left|\frac{\beta}{\beta_{threshold}} + \frac{\dot{\beta}}{\dot{\beta}_{threshold}}\right| > 1$$

The condition can be used to down the target yaw-rate tracking $$\Delta Tq_{yaw\_trgt\_conditioned} = \Delta Tq(1 \to 0) * f\left(\left|\frac{\beta}{\beta_{threshold}} + \frac{\dot{\beta}}{\dot{\beta}_{theshold}}\right| - 1\right)$$

Or the condition can be used to generate an amount of torque opposing the increase of side-slip angle and side-slip velocity $$\Delta Tq_{yaw\_trgt\_\beta d\beta} = PID\left(\left|\frac{\beta}{\beta_{threshold}} + \frac{\dot{\beta}}{\dot{\beta}_{theshold}}\right| - 1\right)$$

$$\Delta Tq_{yaw\_trgt\_conditioned} = \Delta Tq_{yaw\_trgt} + \Delta Tq_{yaw\_trgt\_\beta d\beta}$$

In another implementation, instead of the linear relationship $$\left|\frac{\beta}{\beta_{theshold}} + \frac{\dot{\beta}}{\dot{\beta}_{theshold}}\right| > 1$$

a hyperbolic or an elliptic relationship β-dβ on the phase-plane of FIG. 4 may be used.

The controller 25 is configured to control the two electric motors 14, 15 respectively with an appropriate driving torque and an appropriate braking torque so as to generate the desired amount of vehicle corrective yaw torque. The driving and braking torques are applied to the rear wheels 10, 11 in addition to any traction torque for normal forward propulsion of the vehicle being applied to the front and/or rear wheels, e.g. by an internal combustion engine or by the electric motors 14, 15 themselves, or in addition to any regenerative braking torque for overall deceleration of the vehicle being applied by the electric motors 14, 15 themselves. If traction or braking torque is already being applied by the two electric motors 14, 15, then the driving and braking torque applied to the rear wheels for providing corrective yaw torque will be applied as differential yaw torque that is applied respectively as a positive and negative (i.e. opposing) modulation on the traction torque or on the braking torque. In either case, the corrective yaw torque applied by the motors 14, 15 is effected by opposing (driving and braking) torques applied to the motors as a differential torque, whether alone or on top of any normal traction or vehicle braking torque. Thus, it will be understood that the differential torque applied to the rear wheels may result in (i) a net positive torque on one wheel and a net negative torque on the other wheel; (ii) a net positive torque on both wheels, but one larger than the other; and (iii) a net negative torque on both wheels, but one larger than the other.

The amount of driving torque requested of the motors for traction can be determined in a variety of ways and its exact computation is essential part in the development of a hybrid powertrain. In one implementation, a travel sensor is used to monitor the driver acceleration pedal demand $Ped_{acc\_driver}$, and its output is multiplied by a transfer function $TF_{pedal\_to\_rear\_wheel\_torque}$, to determine the desired amount of traction torque for both left and right rear wheels. The transfer function is a tuneable look-up table for the gain scheduling, plus a low pass filter for the tuning of the dynamic response $$Tq_{whl\_rear\_traction(left,right)} = Ped_{acc\_driver} * TF_{pedal\_to\_rear\_wheel\_torque}$$

When the front wheels are driven by the internal combustion engine, a similar transfer function $TF_{pedal\_to\_front\_wheel\_torque}$ can be used to determine the amount of traction torque requested to front wheels, whilst the transfer function to rear wheels $TF_{pedal\_to\_rear\_wheel\_torque\_reduced}$ will have reduced gains to keep consistent the overall vehicle traction response to driver acceleration pedal input.

From a performance point of view, it is obviously desirable to maximise the traction opportunity given by the motors, but at same time the vehicle stability needs to be guaranteed. Whilst cornering under traction, rear wheels, and in particular the inside least loaded wheel, may saturate their longitudinal force capacity with the risk of their working point reaching region B of FIG. 5, which may cause wheel spin. Use of traction control eliminates this risk, but introduces a yaw imbalance if the traction on the other wheel is not accordingly capped too. On the other hand, capping the traction request on the wheel whose longitudinal force capacity is not saturated means reducing the acceleration performance of the vehicle. Using the yaw control system whilst the rear motors are being used for traction mitigates this issue and allows maximisation of acceleration performance. During a traction event, the weight transfer due to vehicle acceleration increases the vertical force acting on the rear axle, and consequently increases the lateral force capacity of the rear axle, eventually bringing the vehicle to understeer. In order to follow the target yaw rate, the resulting correction of the yaw controller will act in the direction of braking the inside least loaded wheel (hence decreasing the traction request), and will drive the most loaded outside wheel (hence increase the traction request), as shown schematically in FIG. 14a. At the same time the yaw authority will be enhanced by the fact that the starting point on the least loaded wheel, being under traction, is further away from the peak longitudinal capacity with respect to the braking torque commanded by the yaw controller. In other words, there is a synergic action in which the traction request increases the effectiveness of the yaw correction, and the yaw correction increases the amount of traction capability of the rear axle.

Complementarily, a regenerative braking torque can be commanded to both motors either by using the information output from accelerator pedal in lift-off condition, and/or by adding a sensor to monitor the driver brake pedal request $Ped_{brake\_driver}$ (e.g. the brake pedal travel) and by determining a transfer function $TF_{brake\_to\_rear\_wheel\_torque}$ $$Tq_{whl\_rear\_brake(left,right)} = Ped_{acc\_driver\_liftoff} * TF_{pedal\_to\_rear\_wheel\_torque} + Ped_{brake\_driver} * TF_{brake\_to\_rear\_wheel\_torque}$$

For improved battery range it is highly desirable to maximise regenerative braking, but vehicle stability must be guaranteed. During regenerative braking in a corner, a demand for too large a braking torque may cause rear-wheels to lock, particularly the inside least loaded wheel, with consequent risk of vehicle spin. Use of ABS control eliminates the risk, but introduces a yaw imbalance if braking on the second wheel is not capped at the same time too. On the other hand, capping the regenerative braking request on a wheel whose longitudinal force capacity is not saturated means reducing the performance of the energy regeneration mechanism. Using the yaw controller whilst the rear motors are being used for braking mitigates this issue and allows maximisation of regenerated energy. During a braking event, the weight transfer due to vehicle deceleration decreases the vertical force acting on the rear axle, and consequently decreases the lateral force capacity of the rear axle, eventually bringing the vehicle to oversteer. In order to follow the target yaw rate, the resulting correction will act in the direction of driving (hence decreasing the braking request) the inside least-loaded wheel, and will further brake the most loaded outside wheel (FIG. 14b). At the same time the yaw authority will be enhanced by the fact that the starting point on the least loaded wheel, under braking, is further away from its peak longitudinal capacity with respect to the driving torque commanded by the yaw controller. In other words, there is a synergic action in which the regenerative braking increases the effectiveness of the yaw correction, and the yaw correction increases the regenerative braking capability of the rear axle.

In preferred arrangements, the controller 25 is configured to control the two electric motors 14, 15 respectively to apply desired driving and braking torques that are equal (but opposite) in magnitude. In this way, the net effect on the speed of the vehicle is negligible or only minor, i.e. the yaw control system is neither increasing nor decreasing the vehicle's speed commanded by the driver via the throttle pedal, so it is not intrusive to the driver and can be used with no side-effects in the sub-limit region. In preferred arrangements, the electrical energy required to provide the driving torque to one of the motors 14, 15 is provided by the regenerative effect of the other one of the motors 14, 15 providing a braking torque, thereby improving the energy efficiency of the operation, hence the requirement for a small battery to enable the yaw-control functionality. With this arrangement, there may be no dissipation of battery energy except for losses due to regeneration efficiency. Thus, in a general aspect, the vehicle may be configured to provide the electrical energy required to provide the driving torque to one of the motors 14, 15 by energy recovered from the other one of the motors 14, 15 providing a braking torque. In the case where the motors 14, 15 are also providing traction torque for normal forward propulsion of the vehicle, it will be understood that the saving in energy requirement of the motor providing braking torque will offset the additional energy requirement of the motor providing the additional driving torque.

In cornering scenarios, the electrical energy balance resulting from motors 14, 15 controlled to apply desired driving and braking torques which are equal (but opposite) in magnitude may not be null, and its sign will in general depend on whether the faster outside wheel is commanded to apply a driving or braking torque, i.e. for an understeer or an oversteer correction respectively:

$$P_{eDC\_US} = +Tq_{eDC} * R * \left(v_x + \dot\psi * \frac{tr}{2}\right) - Tq_{eDC} * R * \left(v_x - \dot\psi * \frac{tr}{2}\right) * \eta_{reg}$$

$$P_{eDC\_OS} = -Tq_{eDC} * R * \left(v_x + \dot\psi * \frac{tr}{2}\right) * \eta_{reg} + Tq_{eDC} * R * \left(v_x - \dot\psi * \frac{tr}{2}\right)$$

where $P_{eDC\_US}$, $P_{eDC\_OS}$ is the power dissipated or regenerated during the correction of understeer or oversteer respectively; tr is the vehicle track; $v_x$ is the vehicle speed; $Tq_{eDC}$ is the torque commanded at each wheel by the yaw controller 25; $\eta_{reg}$ is the regeneration efficiency; R is the wheel radius.

By neglecting the regeneration efficiency, a linear relationship between power, either dissipated or regenerated, and vehicle yaw-rate can be written:

$$P_{eDC\_OS} = Tq_{eDC} * R * \dot\psi * tr$$

$$P_{eDC\_US} = -Tq_{eDC} * R * \dot\psi * tr$$

In other words, as an analogy with acceleration boost and regenerative braking, where the power either dissipated or regenerated is proportional to vehicle speed, this yaw control system can be seen as a yaw motion regeneration device, capable of mitigating transient oversteer events by storing the surplus of yaw energy and reusing such energy to mitigate understeering events.

To amplify the effect of this yaw-energy regeneration mechanism during correction of oversteer, it is also possible to configure controller 25 to command motors 14, 15 to follow a yaw rate target chosen for example within area C of FIG. 3, i.e. more understeering respect to baseline behaviour 31. This will result in a less agile yawing of the vehicle, because the yaw torque generated by motors 14, 15 will oppose the yaw motion commanded by the driver also during sublimit driving, but it will also result in energy being regenerated into the battery pack 9b-9c of FIG. 1 during sublimit cornering scenarios.

At wheel level, the desired driving and braking torque commanded by the yaw rate controller F7 and F8 of FIG. 10 may be limited to ensure that the wheels will not spin or lock. Therefore, preferably a control on maximum wheel rotational acceleration, or a wheel slip control loop, or at least a wheel slip saturation block, may also be implemented. In conservative behaviour the control means may ensure that the lower-loaded inner tyre is working in the region A of FIG. 5, i.e. delivering torque without reducing excessively the maximum lateral force capacity, in order not to jeopardise the vehicle stability.

Figure 5:
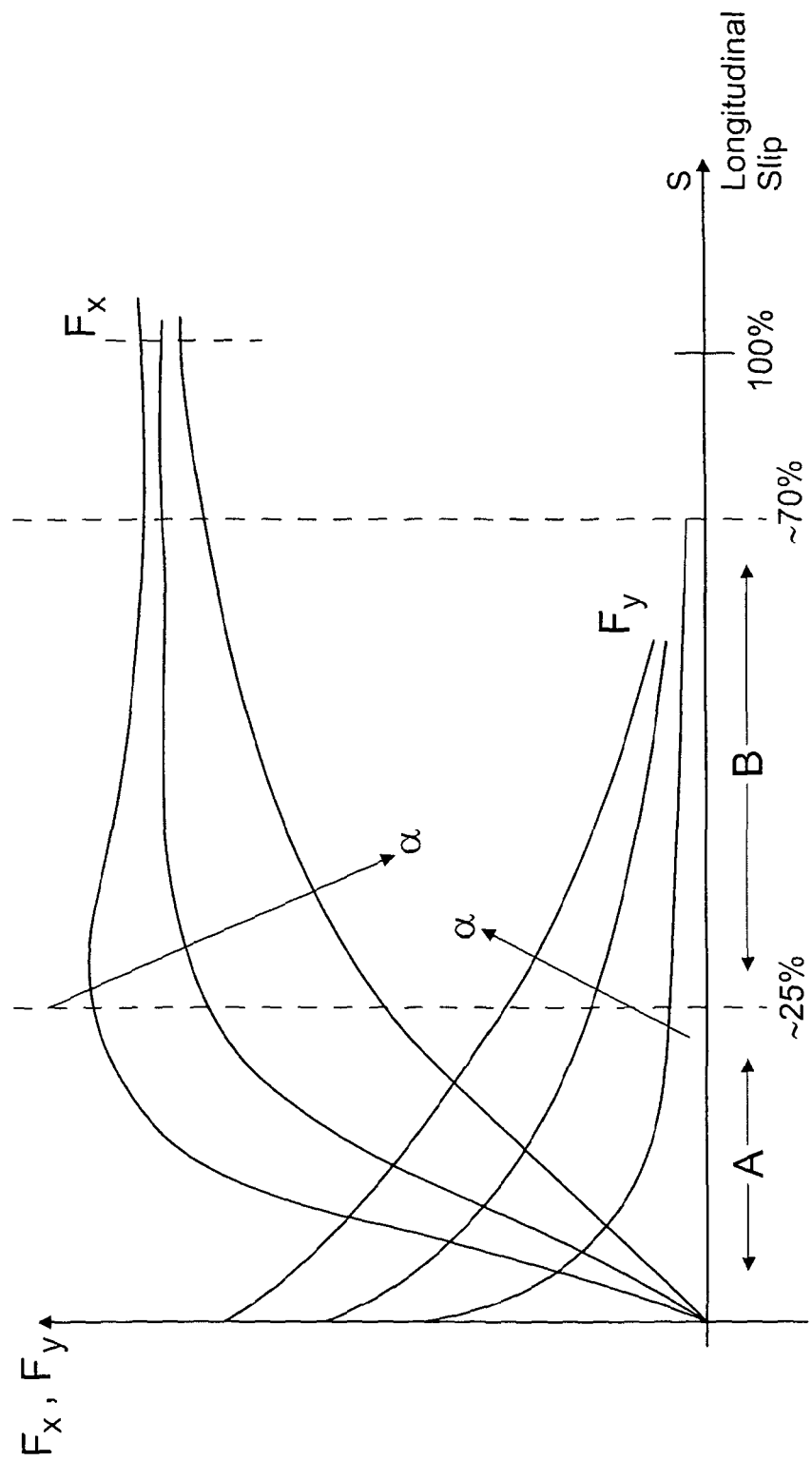
FIG. 5 shows the control envelope on a tyre forces diagram as a function of longitudinal and lateral slips.

In another implementation, it may be requested for the lower-loaded inner tyre to work in the region B of FIG. 5, so to reduce the lateral force and allow the vehicle to increase yaw-rate. In severe understeer behaviour, it is possible to also have the outer highly loaded wheel work in region B of FIG. 5. In this case there is maximum yaw-rate tracking, however the requirement of equal torque will not be respected (driving force on the outer wheel is larger than braking force on the inner wheel); such condition can be accepted in some scenarios, for instance when associated with a prolonged lateral drift of the vehicle induced by the driver, with the consequent decrease of speed associated to the drift.

The simplest way to map the target corrective yaw torque to the wheel torques is:

$$Tq_{whl(L,R)} = \pm \frac{\Delta Tq_{yaw}}{\text{track}} * R_{whl}$$

The sign of the wheel torques will be dictated by the sign of the corrective yaw moment, i.e. for a positive corrective yaw moment the left wheel torque will be negative (braking), the right wheel torque will be positive (traction).

The desired driving and braking torque are physically limited to the amount of torque that the rear wheels can apply on the ground $$Tq_{whl} \leq \mu * Fz * R_{wheel}$$

As a consequence, to ensure the requirements of equal braking and driving torque, the target value will be saturated to the inner wheel with smaller Fz $$Tq_{whl(L,R)} \leq \mu * \min(Fz_{(L,R)}) * R_{wheel}$$

The simplification introduced with this implementation is that the corrective yaw torque $\Delta Tq_{yaw}$ is entirely given by longitudinal forces Fx, and the contribution associated to lateral force decrease $\Delta Fy$ is not taken into account, consequently the corrective yaw torque acting on the vehicle will be larger than the intended request $\Delta Tq_{yaw}$. However the closed control loop will adjust the gains automatically to compensate for this excess of torque applied.

In another implementation a combined-slip tyre model is used, either as analytical model (e.g. combined-slip Pacejka model, combined-slip brush model or equivalent) or as look-up tables normalised against Fz and functions of longitudinal slip and slip angle, to take into account the non linearity of tyres shown in of FIG. 5, showing a decrease in longitudinal force capacity with slip angle and a decrease in lateral force capacity with longitudinal slip.

Figure 11:
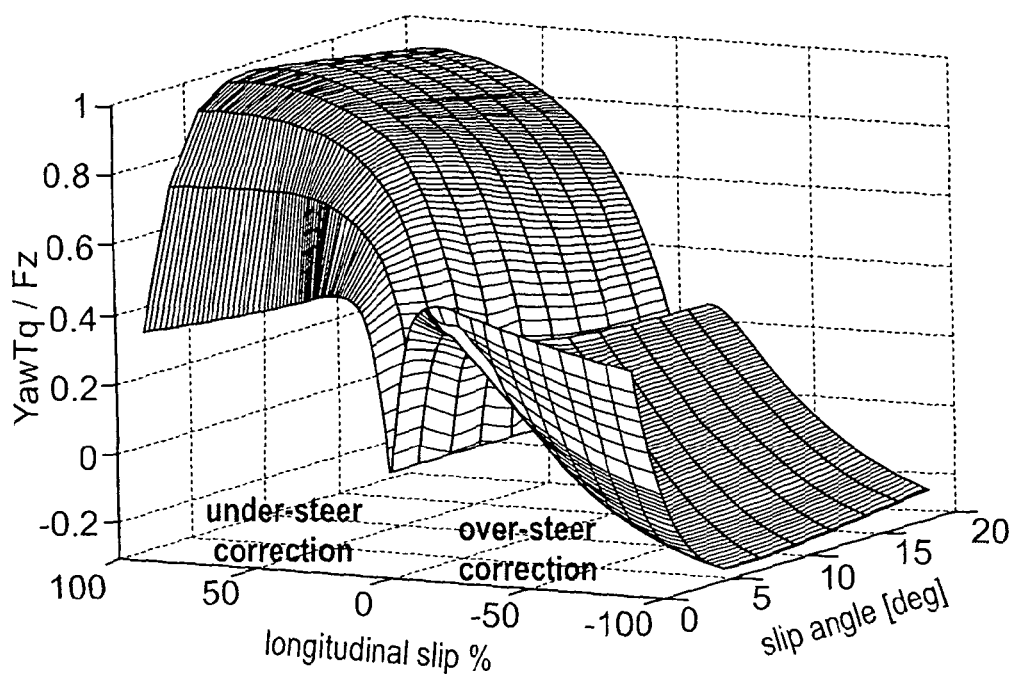
FIG. 11 is a graph showing yaw torque/wheel vertical force as a function of longitudinal slip and slip angle.

Knowing the vehicle states ($\alpha$, $s_0$, $F_L$, $\mu$) before the control intervention, and with ($s_{trgt}$) being the control means target intervention, each wheel contribution to vehicle yaw torque is:

$$\Delta Tq_{yaw}\{F_x(s_{trgt})-F_{x0}\}*tr/2\pm\{F_y(s_{trgt})-F_{y0}\}*b$$

where tr is rear track and b the distance from the C.O.G. to the rear axle. The sign convention reflects the fact that the decrease in lateral force may add or subtract yaw torque from the control system intervention depending on the sign of the target yaw torque (i.e. when in either the under-steer or over-steer scenario). This is shown in FIG. 11.

When both wheels are taken into account, the target longitudinal slip values ($s_L$) ($s_R$) are searched to minimise the function:

$$\Delta Tq_{yaw\_trgt}-[Fx_L(\alpha,s_0,Fz_L,\mu)-Fx_L(\alpha,s_L,Fz_L,\mu)]*tr/2+\\ [Fy_L)\alpha,s_0,Fz_L,\mu)-Fy_L(\alpha,s_L,Fz_L,\mu)]*b-[Fx_R(\alpha,s_0,Fz_R,\mu)-Fx_R(\alpha,s_R,Fz_R,\mu)]*tr/2+[Fy_R(\alpha,s_0,Fz_R,\mu)-Fy_L(\alpha,s_R,Fz_R,\mu)]*b+0$$

with the constraint (normal non-intrusive behaviour): $Fx_L=Fx_R$. Note that $Fx_{R0}$ and $Fx_{L0}$ are null if the rear wheels are not used to provide traction or braking, and are known as feedback values if the rear wheels do provide traction or braking.

Figure 12:
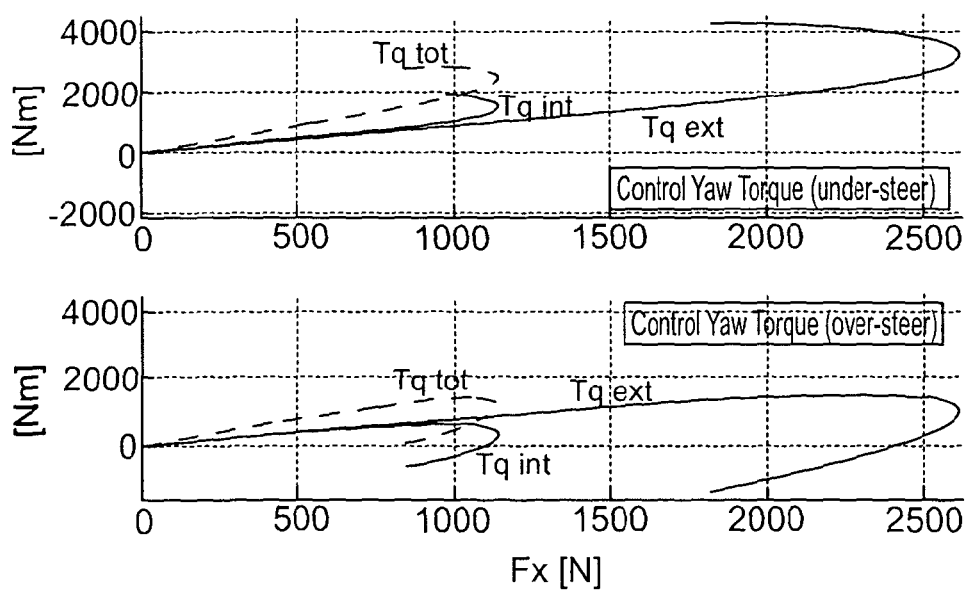
FIG. 12 is a graph showing exemplary yaw-torque applied to each of the rear wheels and total torque, for controlling understeer (upper graph) and for controlling oversteer (lower graph), for determined cornering conditions.

When the constraint $Fx_L=Fx_R$ is used, by using an example cornering condition ($\alpha$=6 deg, $\mu$=0.5, $F_{zl}$=2500N and $F_{zr}$=5500N), and plotting the yaw torque per wheel as function of $F_x$, we obtain the scenario depicted in FIG. 12.

In both understeer scenario (upper half FIG. 12) and oversteer scenario (bottom half FIG. 12) the maximum of total yaw torque is found at or before the peak of longitudinal capacity of the least loaded wheel, because the Fx request of the most loaded wheel must be limited. Therefore in a preferred implementation the control means will limit the wheel slip on the least loaded wheel (master) to the peak longitudinal friction in all driving conditions (e.g. similar to an ABS/TCS intervention), and will saturate accordingly the torque request on the most loaded wheel (slave). This strategy is also robust for stability, because the lateral forces are never reduced excessively.

In one implementation, the target values for longitudinal slip on the left and right wheel ($s_L$) ($s_R$) can be found at same time with on-line optimisation of the equation above and with the constraint $Fx_L=Fx_R$. This approach is the most comprehensive because it gives all information of the two target working points on the 2 wheels ($s_{L\_trgt}$, $Fx_{L\_trgt}$) ($s_{R\_trgt}$ $Fx_{R\_trgt}$).

In another implementation, if the tyre model is not taken on-board as either model or look-up table to be used in real-time by the controller, only the target value for the wheel closer to the peak longitudinal capacity (master wheel) can be set ($s_{trgt}$), and the target $F_{x\_trgt}$ approximated neglecting the lateral force decrease. During cornering, when starting from free rolling conditions the master wheel is the inside least loaded wheel, but in a condition of either regenerative braking or traction this is in general not true and it will depend from the sign and magnitude of the yaw torque control request. In general, the master wheel will be the wheel which first exceeds the longitudinal slip target. In this way the master wheel will be kept in slip control if an excessive target force $F_{x\_trgt}$ is requested, whilst the opposite wheel will be kept as slave, i.e. its torque request also reduced to guarantee an ideal differential torque actuation, with a total balance of torque commanded on rear axle kept null. The target value for the target slip is determined based on engineering knowledge, accounting that the peak of longitudinal capacity is found at higher longitudinal slip when slip angle is increased (FIG. 5). A default setting is:

$$s_{trgt}=[10\%-30\%]=f(\alpha=[0-15\ deg])$$

The flexibility of the independently controlled twin motors allows for many modifications to this preferred implementation.

Another implementation is to use as $s_{trgt}=f(\alpha)=[30\%-70\%]$ for the master wheel, with the opposite wheel designated as slave. This doesn't much change the total yaw torque but reduces the lateral force of the rear axle. This can be associated to a driving scenario where the yaw rate error is large (severe understeer, e.g. >10 deg/s) and the side-slip velocity small (e.g. <5 deg/s, low dynamic manoeuvre).

Another implementation is to use as $s_{trgt}=f(\alpha)=15\%-10\%$) for the master wheel, with the opposite wheel designated as slave. This reduces the control yaw torque but keeps the lateral force of the rear axle large. This can be associated to a driving scenario where the side-slip velocity and side-slip angle thresholds are being approached (high dynamic manoeuvre or high saturation of the rear wheels).

Another implementation is to use as $s_{trgt}=f(\alpha)=[30\%-70\%]$ for the master wheel, and also $s_{trgt}=f(\alpha)=[30\%-70\%]$ for the opposite wheel. This can only be used during the steer-controlled-drift manoeuvres: this situation is unbalanced because it introduces net positive torques at the wheels but appropriately tuned it may be positively perceived by the driver, who wants to exit the drift as fast as possible.

Depending whether the target state for each tyre ($Fx_{\_trgt}$, $s_{trgt}$) is within the region A or region B of FIG. 5, one of the two values (either $s_{trgt}$ or $Fx_{\_trgt}$) may be artificially increased by a factor to ensure respectively force control or slip control.

The longitudinal slip on rear wheels is calculated from rotational equivalent wheel velocity v, and vehicle equivalent wheel velocity $v_{x,\ wheel}$ $$s = \frac{(v_{x,rot}-v_{x,wheel})}{\max(v_{x,rot},v_{x,wheel})}$$

$$v_{x,rot} = \omega * R_{whl}$$

$$v_{x,wheel} = v_{x,CoG} \pm \dot{\psi} * \text{track}/2$$

By simultaneous appearance of longitudinal slip s and lateral slip $\alpha$, one possible definition of longitudinal slip is:

$$s = \frac{(v_{x,rot}*\cos(\alpha)-v_{x,wheel})}{\max(v_{x,rot}*\cos(\alpha),v_{x,wheel})}$$

In this implementation, once the target slip $s_{trgt}$ is established, the wheel torque control loop is implemented as PID of the measured wheel rotational speed respect to the target wheel rotational speed, and it is activated when $\text{abs}(s)>s_{trgt}$.

The target wheel angular speed can be determined from:

$$s_{trgt} = \frac{(v_{x,rot\_trgt} - v_{x,whl})}{\max(v_{x,rot\_trgt}, v_{x,whl})}$$

$$v_{x,whl\_trgt} = \omega_{trgt} * R_{whl}$$

The PID wheel-control loop, if activated, adds a wheel torque $Tq_{whl\_slip\_ctrl}$ to the amount needed to generate the yaw torque $Tq_{whl\_yaw\_ctrl}$ If: $abs(s) > S_{trgt}$ $$Tq_{whl\_slip\_ctrl} = P(\omega_{measured,R} - \omega_{trgt,R}) + I(\omega_{measured,R} - \omega_{trgt,R}) + D(\omega_{measured,R} - \omega_{trgt,R})$$

This is added to:

$$Tq_{whl\_yaw\_ctrl} = \pm F_{x\_trgt} * R_{whl}$$

(from tyre model)

or $$Tq_{whl\_yaw\_ctrl} = \pm \frac{\Delta Tq_{yaw}}{track} * R_{whl}$$

(approximation neglecting the decrease in lateral force)

To obtain:

$$Tq_{whl\_yaw\_ctrl\_conditioned} = Tq_{whl\_yaw\_ctrl} + Tq_{whl\_slip\_ctrl}$$

In another implementation, as additional or alternative conditioning the desired wheel torque mapped from the corrective yaw moment is simply ramped down as function of measured slip, so that the wheel lock or wheel spin never occurs. This simplest approach, using adequately small threshold value for $s_{trgt}$, is sufficient for preventing the vehicle from becoming unstable. The disadvantage is that it is more conservative so the yaw-rate achievable will be smaller.

If $abs(s) > s_{trgt}$ $$\Delta Tq_{yaw\_conditioned} = \Delta Tq_{yaw} * [1 \to 0] = f(|s| - s_{trgt})$$

$$Tq_{whl\_yaw\_ctrl\_conditioned} = \pm \frac{\Delta Tq_{yaw\_conditioned}}{track} * R_{whl}$$

As an addition or as a replacement to the slip control, a conditioning to prevent wheel lock or wheel spin can be based upon the monitoring and control of the rear wheels' rotational acceleration and deceleration. Large values of wheel rotational acceleration or deceleration are in fact in direct relation to respectively an incipient spinning or locking of the wheel.

if: $abs(d\omega_{measured}) > d\omega_{theshold}$ $$Tq_{whl\_d\omega\_ctrl} = P(d\omega_{measured} - d\omega_{theshold}) + I(d\omega_{measured} - d\omega_{theshold}) + D(d\omega_{measured} - d\omega_{threshold})$$

$$Tq_{whl\_yaw\_ctrl\_conditioned} = \pm \frac{\Delta Tq_{yaw}}{track} * R_{whl} + Tq_{whl\_d\omega\_ctrl}$$

or $$\frac{Tq_{whl\_yaw\_ctrl\_conditioned}}{track} * R_{whl} =$$

$$\pm \Delta Tq_{yaw} * [1 \to 0] = f(|d\omega_{measured}| - d\omega_{theshold})$$

where: $d\omega_{measured}$ is the rear wheel rotational acceleration either directly measured or calculated as derivative of the measured wheel rotational speed; and $d\omega_{threshold}$ is the threshold value. Appropriate sensors such as wheel speed sensors 20, 21 may be used for this purpose. Thus, in a general aspect, two sensors may be configured to provide an output indicative of the rotational speeds of the rear wheels, and the controller is adapted to control the first and second electric motors to apply said amount of differential torque without exceeding a threshold value for rotational acceleration and/or deceleration of the rear wheels. A default setting is 1000 deg/s$^2$ as maximum allowed magnitude for both deceleration and acceleration may be used as the threshold value.

In one implementation, when a limitation of the nominal yaw-control request is enforced on one wheel (master) either by the slip control or by the wheel acceleration control, the request on the opposite wheel (slave) is limited accordingly to guarantee an ideal differential intervention without net traction or braking torque applied to the vehicle.

The wheel torque request is multiplied by the ratio motor/wheel τ to determine a motor torque request, and this is sent for actuation to the motor controller. τ is 1 if direct drive in-wheel motors are used. Standard motor controllers have a high bandwidth, so the torque effectively delivered by the system can track without delays both the torque demands determined by the yaw-rate control loop (slower) and by the wheel-slip control loop (faster)

$$Tq_{motor} = Tq_{whl} * \tau$$

Figure 13:
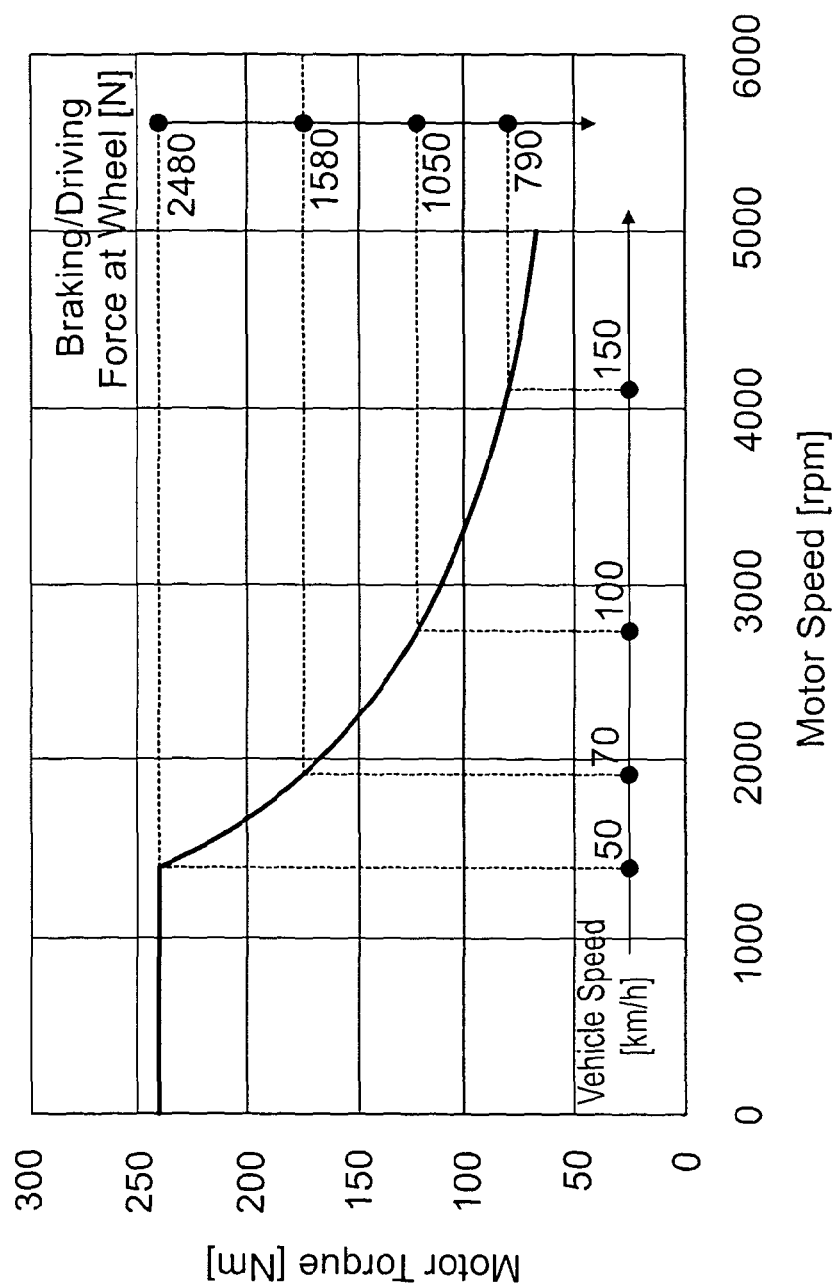
FIG. 13 is a graph showing motor torque requested as a function of motor speed saturated to constant power characteristics of the motor for an exemplary configuration.

The torque requested in actuation to the motor needs to be saturated to the constant power characteristics of the motor. In case of a power=35 kw it is the black line in FIG. 13 where also a low-speed torque reduction is taken into account. The vehicle speed and wheel force refer to an example scenario with τ=3 and a wheel size of about $R_{whl}$=300 mm. When one of the two motors' requests hits the available torque saturation limit, the other request is saturated accordingly to keep the difference across the axle constant. This ensures the actuation of the powertrain request (if the motors are also used for traction) although the effectiveness of the yaw torque intervention will be reduced.

The estimated road friction μ is used in several parts of the controller (generation of the target, observer of FIG. 9, determination of target wheel torques and slips).

In one preferred implementation, the μ is presumed to be 1 (as on dry road) until non-stationary behaviour is detected, then μ is assumed to be the maximum lateral acceleration measured during the non-stationary behaviour, or preferably the result of measured lateral and longitudinal accelerations, and kept constant until the non-stationary behaviour is terminated, and then ramped back to 1. To detect non-stationary behaviour, a threshold on dβ can be used (e.g. $d\beta_\mu$ in FIG. 4). Other methods to detect non-stationary behaviour if dβ is not available are based on comparison between derivative of yaw-rate target and derivative of yaw-rate measured. Other methods to determine μ use comparison between tyre forces, and are effective when more complex versions of the observer of FIG. 9 are used. In general, calculation of μ in conditions with vehicle not at limit of adhesion is difficult and normally not necessary.

Estimation of Fz is needed for the determination of target wheel torques and in general as input for the tyre models, e.g. in the observer of FIG. 9. In this application, a single-track observer with no suspension is used, Fz is computed from mass and CoG height and measured acceleration. With some simplification $$F_{z(L,R)} = \frac{M_R * g}{2} \pm \frac{M_R * a_y * h_{COG}}{track}$$

$$M_R = \frac{M_{tot} * a}{l} - \frac{M_{tot} * a_x * h_{COG}}{l * g}$$

$M_{tot}$ is the total mass of the vehicle, and $M_R$ is the mass on the rear axle Another method requires usage of a two-tracks observer, having as additional degree of freedom roll angle, and as additional parameters roll-stiffness, roll-angle and roll-centre-height. Another method requires an observer with four additional degrees of freedom for corners un-sprung masses, and with vertical stiffness and vertical damping as additional parameters.

If the vehicle has an EV mode, a routine to identify the vehicle nominal mass $M_{tot}$ may be also included, relying on the benefit that in EV mode the torques at the wheels are known and the inertia of the rotating parts is constant. At low speed, i.e. neglecting the aerodynamic losses:

$$Tq_{whl\_traction} = M_{tot} * a_x + Tq_{res}$$

$$Tq_{res} = R_{whl} * (C_f g M_{tot}) + J_{tot} \ddot{\theta}$$

with Cf=rolling resistance and $J_{tot}$=total inertia of the rotating parts.

The controller 25 can be used to mitigate the yaw imbalance caused by the failure of one of the motors 14, 15 whilst the motors are being used for traction or for regenerative braking.

Electric motor inverters typically have a built-in diagnostic and will report on the CAN if there is a failure in the system. As additional independent diagnostic, motor failure can be detected for instance by comparing the requested motor torque with the feedback motor torque.

Electric motors typically fail open, i.e to a free rolling condition. A motor failure of this sort during traction (FIG. 14*c*) will introduce a yaw-rate error that will be detected by the controller 25, and a subsequent request of corrective yaw torque will be generated. In one implementation, if the diagnostic information is not used, the resulting request will be still in the direction of decreasing the driving torque on the motor still working. In another preferred implementation the diagnostic information is used, and the torque request will be larger in magnitude, hence more effective, because the entire target yaw torque is now mapped to one single wheel:

$$Tq_{whl\_yaw\_ctrl} = \pm \frac{\Delta Tq_{yaw}}{track} * R_{whl} * 2$$

The same yaw mitigation mechanism will be in place if the failure happens during a regenerative braking event (FIG. 14*d*).

Thus, in the event of a failure of one of the first and second electric motors during vehicle acceleration, it is possible to control the other electric motor to apply an amount of braking torque thereby applying a differential torque to the first and second rearwardly positioned wheels and reducing a yaw rate error due to the failure of one electric motor. Similarly, in the event of a failure of one of the first and second electric motors during a regenerative braking event, it is possible to control the other electric motor to apply an amount of driving torque thereby applying a differential torque to the first and second rearwardly positioned wheels and reducing a yaw rate error due to the failure of one electric motor.

After the transient yaw unbalance due to motor failure is mitigated, the yaw control system can be still used to enforce yaw stability of any subsequent single-motor limp mode operation of the vehicle.

As a first embodiment, the controller 25 is configured so that, if as target line 32 of FIG. 3 is chosen, when the front tyres saturate (line 31*a*) an understeer is detected, and a corrective yaw torque is generated using the motors 14, 15. Therefore, in a typical constant-radius cornering understeer diagram ΔHW-Δay of FIG. 6, the linearity of the vehicle response to driver input is increased with respect to the baseline configuration (line 61), i.e. the vehicle can achieve same levels of acceleration with a more linear change in handwheel angle (line 62).

Figure 6:
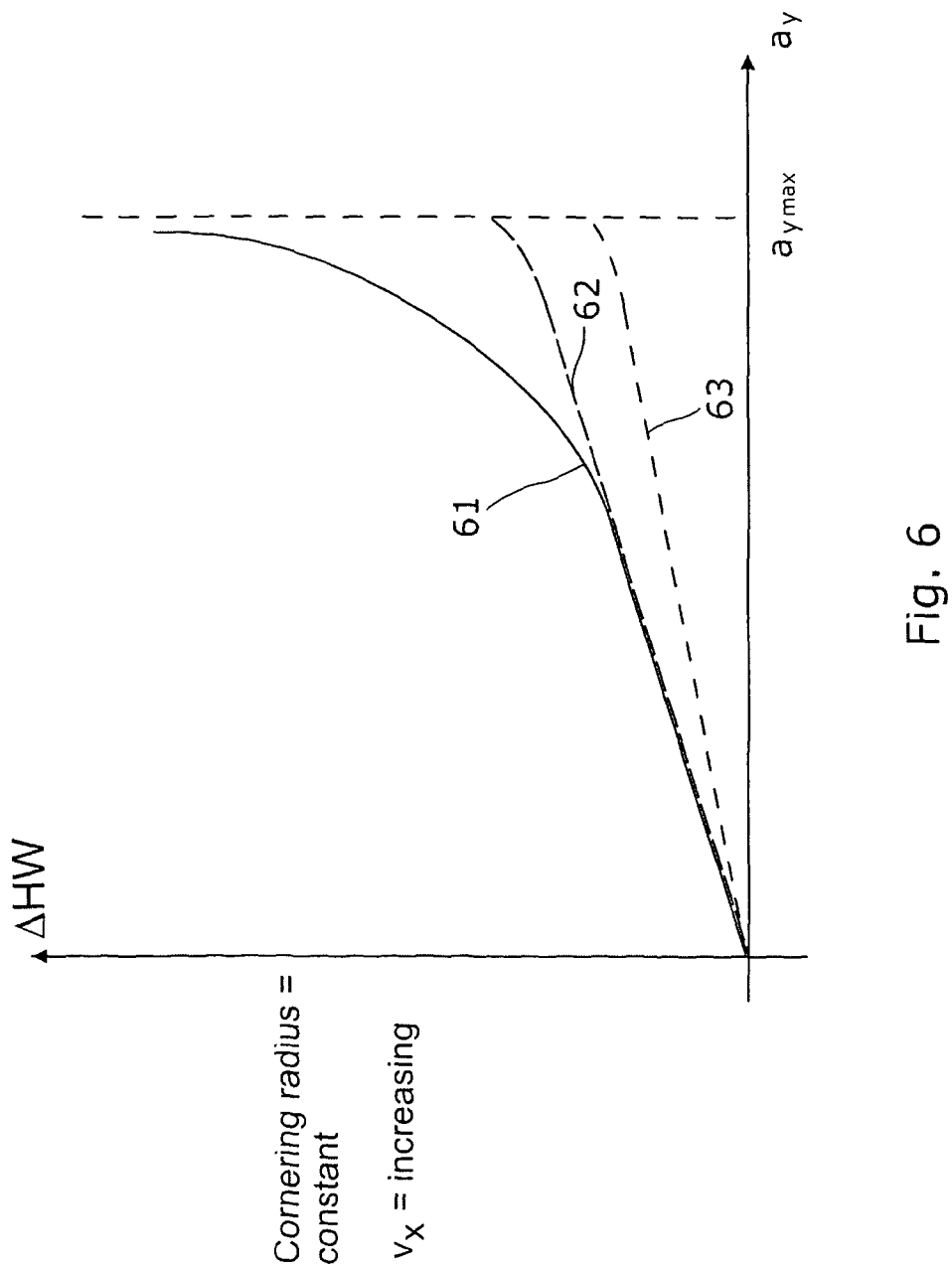
FIG. 6 shows the control envelope in steady-state manoeuvres as achievable understeer characteristic for change in hand wheel angle versus lateral acceleration.

In another embodiment, if a yaw-rate profile like line 33 of FIG. 3 is used, the active yaw correction will support the driver steering also in the low acceleration range (line 63 of FIG. 6).

In another embodiment, the controller 25 is configured so that, if the yaw profile 32*c* of FIG. 3 is used, a positive and controllable side-slip velocity is introduced even if the maximum lateral acceleration as limited by the road coefficient of adhesion is reached, so that the vehicle is capable to yaw by building side-slip-angle in a stable fashion (FIG. 7*b* compared to baseline FIG. 7*a*). This is a unique feature of the system which allows FWD to negotiate corners in a similar way to a powerslide under throttle command for a RWD vehicle.

In another embodiment, the controller 25 is configured so that during transient cornering manoeuvres, the time delay of the yaw-rate and of lateral acceleration respect to the driver steer input can be reduced, hence improving vehicle agility (FIG. 8*a*: line dψ(1) is baseline, line dψ(2) is controlled). This because in the preferred implementation the target yaw-rate is determined without dynamic, i.e. is in-phase with the handwheel command, whilst the measured yaw-rate has a phase delay which is function of vehicle and tyre properties (e.g. yaw inertia and tyre relaxation length).

Figure 8B:
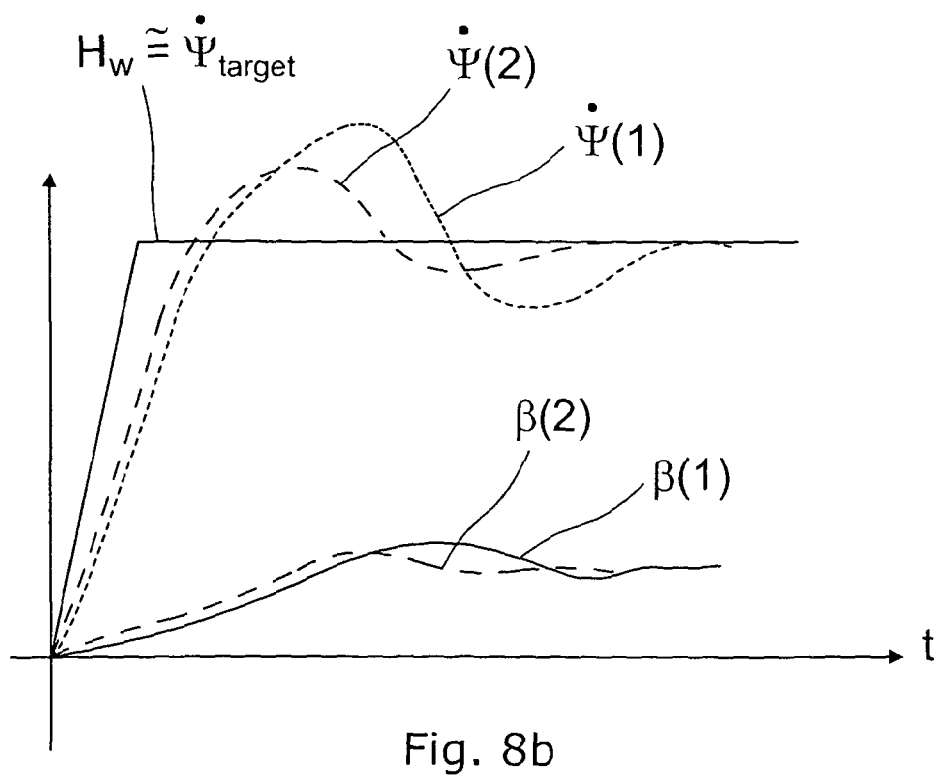

In another embodiment, the controller 25 is configured so that, by imposing a target as line 32 or 32*a* of FIG. 3, i.e. matching the baseline behaviour in the sublimit region or in the limit region, with damped $2^{nd}$ order dynamics or without $2^{nd}$ order dynamic, the yaw-overshoots of the system can be reduced, correcting the transient oversteer condition in which the measured yaw rate is larger than the target, as shown in the step steer of FIG. 8*b* (profiles dψ(1) and β(1) are baseline, profiles dψ(2) and β(2) are controlled).

In another embodiment, the controller 25 is configured 50 that, by imposing a target as line 34 of FIG. 3, i.e. more understeering with respect to baseline behaviour, electric energy can be regenerated in the battery 9*b*-9*c* also during normal sublimit cornering.

Although the exemplary arrangement of FIGS. 1 and 2 shows a hybrid vehicle having an internal combustion engine 7 driving the front wheels 2, 3 via a conventional drive train, and separately controlled electric motor drive to the rear wheels 10, 11, it is to be understood that the yaw control system can be integrated into different configurations of hybrid or all-electric vehicles, such as those in which the internal combustion engine provides electrical power for all-electric motor driven wheels, or vehicle without an internal combustion engine relying only on stored electrical charge or an alternative electrical power source such as fuel cells. The yaw-control system may also operate in a vehicle in which the internal combustion engine operates only intermittently, when battery charge is running low or is insufficient to provide sufficient power for the road speed of the vehicle.

Other embodiments are intentionally within the scope of the accompanying claims.

The invention claimed is:

1. A vehicle comprising:
   at least two forwardly positioned steerable road wheels;
   at least first and second rearwardly positioned wheels disposed on opposing lateral sides of the vehicle, each coupled to a respective first and second electric motor adapted to apply driving and braking torque to the respective wheel, the first and second electric motors being independently controllable;
   at least one angle sensor configured to provide an output indicative of a steering angle of the steerable roadwheels;
   at least one speed sensor configured to provide an output indicative of the vehicle longitudinal speed;
   a vehicle yaw-rate sensor configured to provide an output indicating the vehicle's measured yaw-rate;
   control means adapted to:
      determine a target yaw-rate from at least the road-wheel steering angle and the vehicle longitudinal velocity;
      determine a yaw rate error by comparing at least the vehicle's measured yaw-rate with said target yaw-rate, and determine an amount of yaw torque needed to correct or reduce the yaw-rate error;
      control said first and second electric motors to apply an amount of differential torque to the respective first and second rearwardly positioned wheels so as to generate said amount of yaw torque;
   further including at least one driver brake pedal sensor configured to provide an output indicative of the driver brake pedal demand and/or at least one driver acceleration pedal sensor configured to provide an output indicative of driver acceleration pedal demand, and wherein the control means is further adapted to:
      determine a desired amount of regenerative braking for the first and second electric motors based on the driver brake pedal demand and/or lift-off of the driver acceleration pedal;
      control the first and second electric motors to apply the desired amount of regenerative braking; and
      in the event of a failure of one of the first and second electric motors, control the other electric motor to apply an amount of driving torque thereby applying a differential torque to the first and second rearwardly positioned wheels and reducing a yaw rate error due to the failure of one electric motor.

2. The vehicle of claim 1 in which the forwardly positioned wheels are connected to an internal combustion engine for normal forward propulsion of the vehicle.

3. The vehicle of claim 1 in which the vehicle is configured to provide the electrical energy required to provide the driving torque to one of the motors by energy recovered from the other one of the motors providing a braking torque.

4. The vehicle of claim 1 in which the control means is adapted to determine a target yaw rate which is larger in magnitude than a maximum yaw rate allowed by the road coefficient of adhesion and to apply an amount of differential torque using the first and second electric motors so as to increase the yawing of the vehicle by increasing or building vehicle side-slip angle above the steady-state value allowed by the coefficient of adhesion.

5. The vehicle of claim 1 in which the control means is adapted to determine a target yaw rate which has a phase lag with respect to a steering hand-wheel input, and to apply an amount of differential torque using the first and second electric motors so as to reduce the phase lag of vehicle yaw-rate with respect to driver hand-wheel input.

6. The vehicle of claim 1 in which the control means is adapted to determine a target yaw rate which has a level of damping and control first and second electric motors to apply an amount of differential torque to the respective first and second rearward positioned wheels so as to generate a desired amount of yaw torque to reduce transient yaw overshoots.

7. The vehicle of claim 1 further including two sensors configured to provide an output indicating the rotational speeds of the rear wheels independent of said speed sensor indicating said longitudinal velocity of the vehicle, and wherein the control means is further adapted to
   determine the longitudinal slip of the rear wheels from at least said rotational speed of the rear wheels and vehicle longitudinal velocity;
   determine target values for rear wheels longitudinal slip; and
   control the first and second electric motors to apply said amount of differential torque without exceeding the target values of desired rear wheels longitudinal slip.

8. The vehicle of claim 1 wherein the control means is further adapted to:
   determine the side-slip velocity dl;
   determine a side-slip velocity threshold; and
   control the first and second electric motors to apply said amount of differential torque without exceeding the side-slip velocity threshold.

9. The vehicle of claim 1 wherein the control means is further adapted to:
   determine the side-slip angle fi;
   determine side-slip angle threshold; and
   control the first and second electric motors to apply said amount of differential torque without exceeding the side-slip angle threshold.

10. The vehicle of claim 1 wherein the control means is further adapted to:
    determine the side-slip velocity $d\beta$;
    determine a side-slip velocity threshold;
    determine an amount of target yaw torque based on the magnitude of an error in side-slip velocity with respect to the threshold; and
    control the first and second electric motors to apply said amount of differential torque so as to generate the amount of target yaw torque to oppose side-slip velocity error.

11. The vehicle of claim 1 wherein the control means is further adapted to:
    determine the side-slip angle $\beta$;
    determine a side-slip angle threshold;
    determine an amount of target yaw torque based on the magnitude of the error of side-slip angle respect to the threshold; and
    control the first and second electric motors to apply said amount of differential torque so as to generate the amount of target yaw torque to oppose side-slip angle error.

12. The vehicle of claim 1 in which the control means is adapted to apply equal magnitude differential torque using the first and second electric motors to correct or reduce the yaw rate error.

13. The vehicle of claim 1 further including two sensors configured to provide an output indicative of the rotational speeds of the rear wheels, and wherein the control means is further adapted to control the first and second electric motors to apply said amount of differential torque without exceeding a threshold value for rotational acceleration and/or deceleration of the rear wheels.

14. The vehicle of claim 1 further including at least one driver acceleration pedal sensor configured to provide an output indicative of the driver acceleration pedal demand, and wherein the control means is further adapted to:
- determine a desired amount of traction or braking torque for the first and second electric motors based on the driver acceleration pedal demand;
- control the first and second electric motors to apply said desired amount of traction or braking torque superimposed on said differential torque without exceeding a threshold value of yaw rate error due to the traction or braking torque supplied by the first and second electric motors.

15. The vehicle of claim 1 further including at least one driver brake pedal sensor configured to provide an output indicative of the driver brake pedal demand, and wherein the control means is further adapted to:
- determine a desired amount of braking torque for the first and second electric motors based on the driver brake pedal demand;
- control the first and second electric motors to apply said desired amount of braking torque superimposed on said differential torque without exceeding a threshold value of yaw rate error due to the braking torque supplied by the first and second electric motors.

16. The vehicle of claim 1 further including at least one driver acceleration pedal sensor configured to provide an output indicative of the driver acceleration pedal demand, and wherein the control means is further adapted to:
- determine a desired amount of traction torque for the first and second electric motors based on the driver acceleration pedal demand;
- control the first and second electric motors to apply the desired amount of traction torque superimposed on the differential torque; and
- in the event of a failure of one of the first and second electric motors, control the other electric motor to apply an amount of braking torque thereby applying a differential torque to the first and second rearwardly positioned wheels and reducing a yaw rate error due to the failure of one electric motor.

17. The vehicle of claim 1 in which the control means is adapted to apply an amount of differential torque using the first and second electric motors so as to regenerate electric energy in the battery.

* * * * *